US008737821B2

(12) United States Patent
Li

(10) Patent No.: US 8,737,821 B2
(45) Date of Patent: May 27, 2014

(54) AUTOMATIC TRIGGERING OF A ZOOMED-IN SCROLL BAR FOR A MEDIA PROGRAM BASED ON USER INPUT

(76) Inventor: Eric Qing Li, Dallas, TX (US)

( * ) Notice: Subject to any disclaimer, the term of this patent is extended or adjusted under 35 U.S.C. 154(b) by 0 days.

(21) Appl. No.: 13/485,308

(22) Filed: May 31, 2012

(65) Prior Publication Data

US 2013/0322848 A1    Dec. 5, 2013

(51) Int. Cl.
*H04N 5/783* (2006.01)
(52) U.S. Cl.
USPC ........... 386/343; 715/786; 715/720; 345/173; 725/37
(58) Field of Classification Search
USPC ................. 386/239, 248, 343, 353; 345/173; 715/786, 833, 720; 725/37
See application file for complete search history.

(56) References Cited

U.S. PATENT DOCUMENTS

| | | | | |
|---|---|---|---|---|
| 5,202,961 A * | 4/1993 | Mills et al. | ..................... | 715/720 |
| 5,832,173 A * | 11/1998 | Terasawa et al. | ............ | 386/343 |
| 6,115,037 A * | 9/2000 | Sumiyoshi et al. | ........... | 715/726 |
| 6,211,856 B1 | 4/2001 | Choi et al. | | |
| 6,567,102 B2 | 5/2003 | Kung | | |
| 6,774,890 B2 | 8/2004 | Engholm | | |
| 6,931,594 B1 * | 8/2005 | Jun | .............................. | 715/719 |
| 8,245,138 B2 * | 8/2012 | Nito | .............................. | 715/719 |
| 8,253,704 B2 * | 8/2012 | Jang | ............................... | 345/173 |
| 2002/0063737 A1 * | 5/2002 | Feig et al. | ..................... | 345/786 |
| 2004/0046887 A1 * | 3/2004 | Ikehata et al. | ........... | 348/333.12 |
| 2004/0183817 A1 | 9/2004 | Kaasila | | |
| 2005/0223342 A1 | 10/2005 | Repka et al. | | |
| 2007/0188473 A1 | 8/2007 | Anwar | | |
| 2008/0122796 A1 | 5/2008 | Jobs et al. | | |
| 2008/0168404 A1 | 7/2008 | Ording | | |
| 2008/0231610 A1 | 9/2008 | Hotelling et al. | | |
| 2009/0002324 A1 | 1/2009 | Harbeson et al. | | |
| 2009/0070704 A1 | 3/2009 | Ording | | |
| 2009/0070705 A1 | 3/2009 | Ording | | |
| 2009/0073194 A1 | 3/2009 | Ording | | |
| 2009/0153288 A1 * | 6/2009 | Hope et al. | ..................... | 340/3.1 |
| 2009/0207139 A1 * | 8/2009 | Kraft | ............................. | 345/173 |
| 2009/0237371 A1 | 9/2009 | Kim et al. | | |
| 2009/0282362 A1 * | 11/2009 | Matsumoto | ................... | 715/787 |
| 2009/0288043 A1 | 11/2009 | Willis | | |
| 2009/0292990 A1 | 11/2009 | Park et al. | | |
| 2010/0039400 A1 | 2/2010 | Jang | | |
| 2010/0099462 A1 | 4/2010 | Baek et al. | | |
| 2010/0156818 A1 | 6/2010 | Burrough et al. | | |
| 2010/0214246 A1 | 8/2010 | Park | | |
| 2010/0253620 A1 | 10/2010 | Singhal | | |

(Continued)

FOREIGN PATENT DOCUMENTS

JP        2002-83456    *    3/2002

*Primary Examiner* — David Harvey

(57) ABSTRACT

The present disclosure involves a method of managing media playback. The method includes displaying a media program on a touch screen of an electronic device. The method includes detecting, via the touch screen, an input from a user indicating that the user wishes to fast forward or rewind the media program. The method includes triggering, in response to the detected input from the user, an appearance of a scroll bar including an indicator on the touch screen. The indicator is configured to be moved along the scroll bar. A length of the scroll bar represents a predefined amount of time that is a fraction of a total duration of the media program. A position of the indicator relative to the scroll bar corresponds to a time location of the media program.

21 Claims, 16 Drawing Sheets

(56) References Cited

U.S. PATENT DOCUMENTS

| | | |
|---|---|---|
| 2010/0295798 A1 | 11/2010 | Nicholson et al. |
| 2010/0312462 A1 | 12/2010 | Gueziec et al. |
| 2011/0012928 A1 | 1/2011 | Cholewin et al. |
| 2011/0025627 A1 | 2/2011 | Sakai |
| 2011/0087963 A1 | 4/2011 | Brisebois et al. |
| 2011/0096087 A1* | 4/2011 | Chun .......................... 345/592 |
| 2011/0102455 A1 | 5/2011 | Temple |
| 2011/0119578 A1 | 5/2011 | Schwartz |
| 2011/0157057 A1* | 6/2011 | Hata ............................ 345/173 |
| 2011/0169743 A1 | 7/2011 | Oh et al. |
| 2012/0066637 A1* | 3/2012 | Nakamura et al. ............ 715/781 |
| 2012/0079420 A1* | 3/2012 | Arriola ......................... 715/784 |
| 2012/0079421 A1* | 3/2012 | Arriola ......................... 715/784 |
| 2012/0127107 A1* | 5/2012 | Miyashita et al. ............. 345/173 |

* cited by examiner

AUTOMATIC TRIGGERING OF A ZOOMED-IN SCROLL BAR FOR A MEDIA PROGRAM BASED ON USER INPUT

BACKGROUND

1. Technical Field

The present disclosure generally relates to media playback control. More particularly, the present disclosure relates to a method of navigating through a media program, such as a video playing on an electronic device, in response to user input.

2. Related Art

Traditionally, consumers have been consuming media content such as movies (or other types of videos) by going to a movie theater or by watching media programs on television (TV). For example, a consumer may rent or buy a movie on a cassette tape or a DVD disk and then play the movie on TV using a video cassette player or a DVD player.

In recent years, the rapid advances in computer technology and broadband telecommunications have enabled media content to be played on portable electronic devices such as tablet computers or mobile telephones. For example, a consumer can download a movie to his portable electronic device and subsequently play the movie on the portable electronic device. As another example, the consumer can also watch the movie by streaming the movie to his portable electronic device from a remote computer server. These new ways of consuming media content on a portable electronic device offer convenience and simplicity for the consumers. Nevertheless, existing methods and apparatuses for consuming media content via portable electronic device still have drawbacks. For example, they may not offer sufficient media playback control functionalities for a user.

Therefore, while existing methods and apparatuses for consuming media content via a portable electronic device have been generally adequate for their intended purposes, they have not been entirely satisfactory in every aspect. It would be advantageous to offer enhanced media playback control functionalities for a user.

SUMMARY

One of the broader forms of the present disclosure involves an electronic device. The device involves: a touchscreen configured to receive gestured-based input from a user; a memory storage component configured to store computer programming code; and a computer processor configured to execute the computer programming code to perform the following: displaying a media program on the touch screen; detecting, via the touch screen, the gesture-based input from the user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

Another one of the broader forms of the present disclosure involves a method of managing media playback. The method includes: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

Yet another one of the broader forms of the present disclosure involves a system for playing digital media. The system includes: a computer database configured to electronically stores a plurality of media programs each in a digital format; and a user interface module installed on a portable touch screen electronic device located remotely from the computer database, wherein the portable touch screen electronic device is configured to communicate with the computer database via a wireless or wired telecommunications protocol, and wherein the user interface module contains computer programming instructions, that when executed, perform the following tasks: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

DETAILED DESCRIPTION

Figure 1:
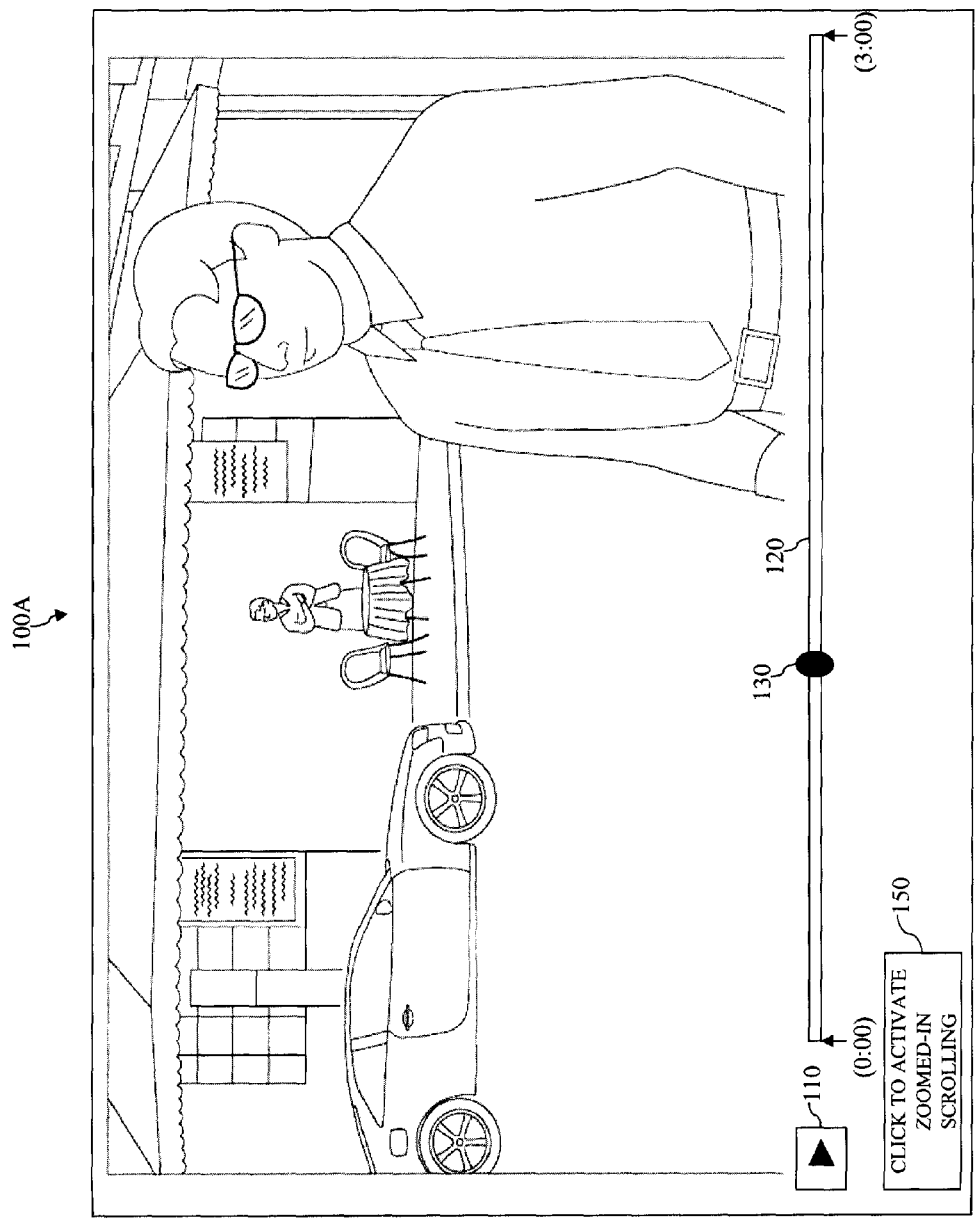
FIGS. 1-12 are example screen shots of various embodiments of user interfaces for displaying and navigating through a media program according to various aspects of the present disclosure.

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity. In addition, the present disclosure may repeat reference numerals and/or letters in the various examples. This repetition is for the purpose of simplicity and clarity and does not in itself dictate a relationship between the various embodiments and/or configurations discussed Consumers have traditionally been consuming media content by watching TV or by going to a movie theater. Recently, rapid advances in computer technology and broadband telecommunications have enabled media content to be consumed on portable electronic devices such as tablet computers or mobile telephones. For example, a consumer can download a media program such as a movie to his portable electronic device and subsequently play the movie on the portable electronic device. As another example, the consumer can also watch the movie by streaming the movie to his portable electronic device from a remote computer server. These new ways of consuming media content on a portable electronic device offer convenience for the consumer (also interchangeably referred to as a user thereafter).

Nevertheless, existing methods and apparatuses of consuming media content via portable electronic device still have drawbacks. One such drawback is that they may not offer sufficient media playback control functionalities for a user. For example, it may not be easy for a user to perform navigational tasks on a portable electronic device, especially if the electronic device is relatively small (for example, if the portable electronic device is a mobile telephone or an undersized tablet computer).

According to the various aspects of the present disclosure, a method and apparatus for enhanced user navigation through a media program is disclosed, as discussed in more detail below.

Figure 2:
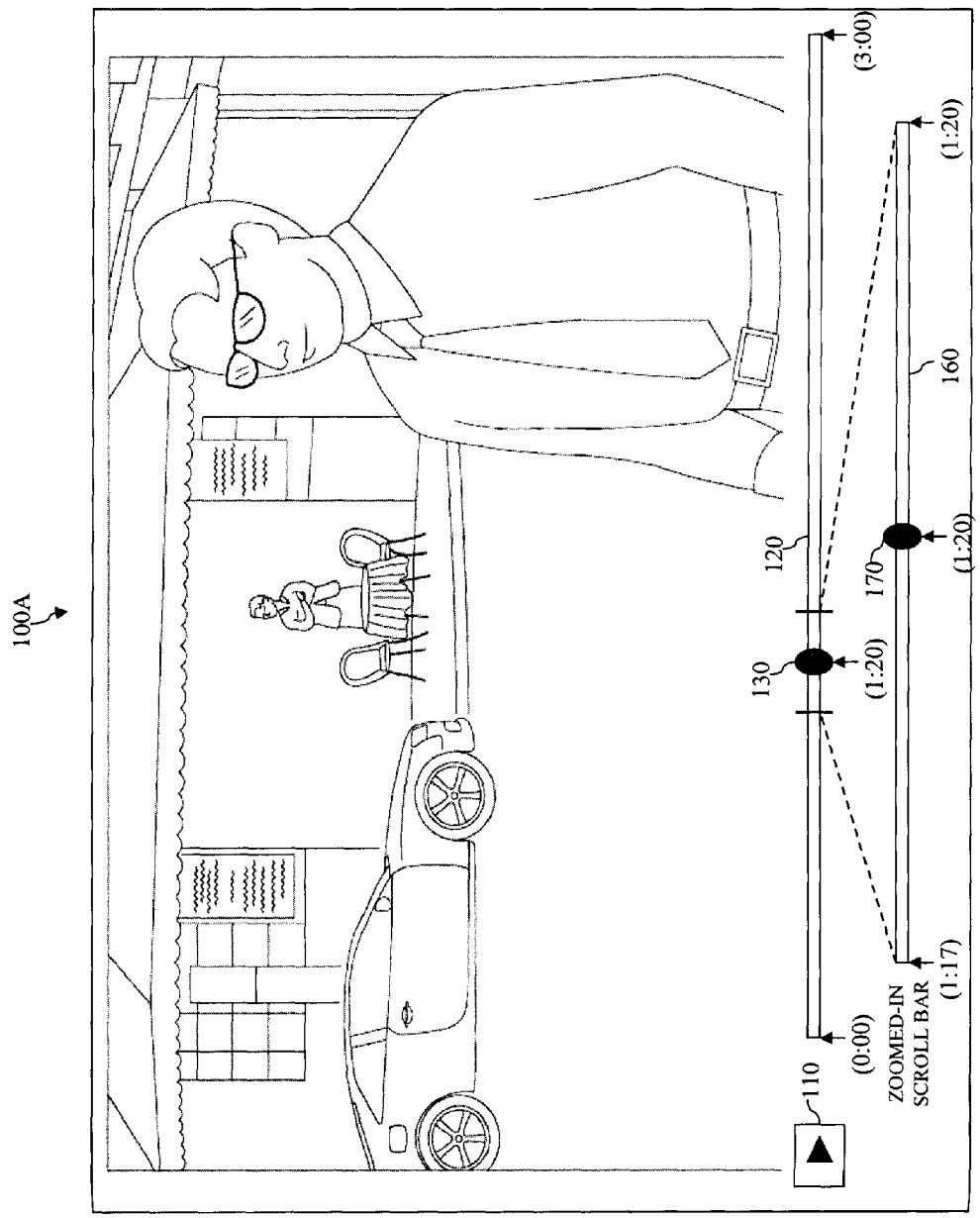

FIGS. 1-2 are various screenshots of a user interface 100A displaying a media program on a portable electronic device according to various aspects of the present disclosure. In various embodiments, the portable electronic device may include tablet computers (for example, APPLE's® IPAD® or various ANDROID® or WINDOWS® powered tablets) or mobile telephones (for example, APPLE's® IPHONE® or various ANDROID® or WINDOWS® powered smartphones). In some other embodiments, the portable electronic device may include computer monitor displays for desktop or laptop computers. In yet other embodiments, the portable electronic device may include controllers for television sets. In some embodiments, the portable electronic device may include a touch-sensitive display (or touch screen) via which the media program may be played. However, it is understood that the various aspects of the present disclosure may apply to a non-touch screen display as well. For example, whereas a touch screen device may detect user input via sensing the contact and the movement of the user's fingers on the touch screen, a non-touch screen device may detect user input via more traditional mechanisms such as a mouse, a keyboard, or voice control.

In various embodiments, the media program may include movies, documentaries, music videos, podcasts, soundtracks, educational programs, sporting events, artistic performances, or any other type of suitable audio/video digital file that can be played on the portable electronic device. In some embodiments, the consumer or user may download the media program to the portable electronic device from a remote server hosted/owned/operated by a media content provider or partner of the media content provider. For example, the media program may be downloaded from APPLE's® ITUNES®, THE APP STORE® from APPLE®, ANDROID's® PLAY STORE®, AMAZON's® INSTANT VIDEO® store, MICROSOFT's® WINDOWS STORE®, RESEARCH IN MOTION's® APP WORLD®, or from a suitable media download service from another service provider. After the media program is downloaded to a local storage of the portable electronic device, the user may then play the media program on the portable electronic device.

In some other embodiments, the user may acquire the media program by digitally converting a legally-owned copy of the media program to a digital file that can be stored on the portable electronic device. For example, the user may use a computer software program to convert a legally-owned DVD copy of a movie into a digital file, and then transfer the digital file of the movie onto the local storage of the portable electronic device.

In yet other embodiments, the user may stream the media program from a remote computer server without having to download the media program in its entirety. For example, service providers such as NETFLIX®, AMAZON®, HULU®, COMCAST®, VUDU®, and REDBOX® may each offer various types of video streaming services for their subscribing members. A user who is a member of these services may log on to the web site (or launch an "app") of the service provider and thereafter select a desired media program to be played. A play request from the user may be then sent to the remote server of the service provider, for example over a suitable wired or wireless telecommunications protocol. After verifying the user's identity and account information, the service provider may then allow the user to stream the media program by continuously sending digital packets to a portable electronic device of the user over the suitable telecommunications protocol. In some embodiments, this type of media content streaming may allow the portable electronic device to build up a "buffer" on a local storage of the portable electronic device, where the buffer may include a portion of the media program. The media program streaming may then be done by retrieving digital content from the buffer, which may be constantly updated.

Referring to FIG. 1, a screenshot of a user interface 100A for displaying and navigating through a media program is shown. The user interface 100A displays a scene from a media program (for example a movie) on the portable electronic device discussed above. The interface 100A may contain virtual on-screen controls such as a play/pause button 110, a scroll bar 120, and a position indicator 130. In some embodiments, these virtual on-screen controls are displayed as the media program is being played. In other embodiments, the display of these virtual on-screen controls can be normally hidden, but their display may be triggered by an appropriate user input. Such user input may be gesture-based, such as a user's tap on the touch screen of the portable electronic device. Such user input may also be voice-based, for example via a suitable voice command from the user.

The play/pause button 110 may be used to play or pause the media program. The scroll bar 120 and the position indicator 130 may be collectively used to perform navigational tasks through the media program. In more detail, the length of the scroll bar 120 may represent a total duration of the media program (for example, 3 hours for a 3-hour movie). The location of the position indicator 130 on the scroll bar 120 indicates a time location of the present scene of the media program being displayed (with respect to the media program as a whole).

The indicator 130 may be moved along the scroll bar 120 in a left direction or a right direction to accomplish certain navigational tasks. For example, a movement of the indicator 130 in the left direction results in a rewinding of the media program, whereas a movement of the indicator 130 in the right direction results in a fast forwarding of the media program. The movement of the position indicator 130 may be accomplished by a user gesture, for example a user using his finger(s) to "drag" the indicator 130 to various locations along the scroll bar 120. Although not specifically illustrated for reasons of simplicity, the interface 100A may also contain other virtual on-screen controls such as volume controls, subtitle displays, mute/unmute, screen resizing, exit media playback, etc.

In certain situations, the above method of performing navigational tasks through the media program may be inadequate or unsatisfactory to the user. As an example, if the media program is long—such as a lengthy movie—a relatively small movement of the position indicator 130 may lead to a relatively large shift in time. This may be undesirable for the user. For example, suppose the user wishes to merely fast forward or rewind through the media program by one or two minutes, or a fraction of a minute, so that he may get a quick preview of what is about to happen in the movie, or he may re-watch a scene that just occurred very recently. To do so, the user may attempt to use his finger(s) to drag the position indicator 130 to the right or left on the scroll bar 120 by what he deems to be a small amount, which may be just a few millimeters. Nevertheless, if the media program is long in duration, even such small amounts of locational shift of the position indicator 130 may result in a larger-than-expected time shift of the media program, for example a time shift of tens of minutes or more. Now the media program is navigated to a scene that is unexpected for the user, and the user may not know how far to go back (or forward). In other words, the user may not be able to quickly return to the initial media program location.

Furthermore, the user may not be able to control the locational shift of the position indicator 130 as precisely as he would like. What often happens is that the user may inadvertently move the position indicator 130 by an amount much larger than intended, thereby causing the media program to jump into a time location that is even farther away than desired. As an example, the user may intend to drag the position indicator 130 to the right by only one millimeter or so, in an effort to fast forward by perhaps a few minutes. However, in actuality, the user may end up dragging the position indicator 130 by five to ten millimeters to the right, thereby causing the media program to skip forward by twenty minutes. These types of problems are even more likely to occur if the user has large hands or fingers, or as the user becomes older and therefore loses precise muscle control. This program is further exacerbated as the screen size of the portable electronic device shrinks, since now a small shift in location of the position indicator 130 leads to an even greater shift in time of the media program. What likely results is a frustrating navigational experience for the user.

According to various aspects of the present disclosure, the user interface 100A allows the user to have enhanced navigational media playback control. In one embodiment, as illustrated in FIG. 1, the user interface 100A contains a virtual icon/button 150. In some embodiments, the display of the icon/button 150 may be triggered along with the display of the other virtual on-screen controls, such as the play/pause button 110, the scroll bar 120, and the position indicator 130.

The virtual icon/button 150 may alert the user that a click or press of the icon/button 150 will lead to enhanced navigation. For example, in the embodiment shown in FIG. 1, the icon/button 150 may display a message such as "click to activate zoomed-in scrolling." In alternative embodiments, the icon/button 150 may not be explicitly displayed outright. Rather, it may be invoked by a detected suitable user gesture, for example by a detected user click or press of the position indicator 130, or by a user voice command. The display of the icon/button 150 may or may not be concurrent with the display of the other on-screen controls such as the scroll bar 120 and the position indicator 130.

Referring now to FIG. 2, the clicking or pressing of the icon/button 150 triggers the interface 100A to display a different scroll bar 160 and another position indicator 170 on the portable electronic device. The scroll bar 160 represents a fraction of the duration of the media program. Stated differently, the scroll bar 160 is a "zoomed-in" version of the scroll bar 120 with respect to time. For example, the total length of the scroll bar 160 may correspond to 1/30 of the total duration of the media program. Thus, if the total duration of the media program is 3 hours, then the total length of the scroll bar 160 corresponds to only 6 minutes of the media program. In some embodiments, the amount of time corresponding to the scroll bar 160 is evenly divided to include an amount of time before the present scene of the media program and an amount of time after the present scene of the media program.

Using the above example, suppose the present scene is at a time location (represented by the location of the position indicator 130) of 1 hour and 20 minutes into the 3-hour media program, then the scroll bar 160 (which has a total time duration of 6 minutes) represents the time from 3 minutes before the 1 hour and 20 minutes, to 3 minutes after the 1 hour and 20 minutes. Thus, the scroll bar represents the time from 1 hour and 17 minutes to 1 hour and 23 minutes. In other words, the beginning of the scroll bar 160 is at the 1 hour and 17 minutes mark of the media program, and the end of the scroll bar 160 is at the 1 hour and 23 minutes mark of the media program.

Similar to the position indicator 130, the position indicator 170 may be moved along the scroll bar 160 to perform navigational tasks. In some embodiments, the position indicator 130 moves along "in sync" with the position indicator 170. In some embodiments, an initial position of the position indicator 170 is at the center or middle of the scroll bar 160—i.e., at 1 hour and 20 minutes into the 3-hour media program using the example discussed above. A movement of the position indicator 170 in the left direction results in rewinding of the media program, whereas a movement of the position indicator in the right direction results in fast forwarding of the media program.

Since the scroll bar 160 corresponds to only a fraction of the total duration of the media program, moving the position indicator 170 along the scroll bar 160 leads to more precise navigational control. For example, instead of risking a greater-than-expected jump forward or backwards (for example, a jump of 10-15 minutes) by moving the position indicator 130 just a few millimeters, the same amount of locational shift of the position indicator 170 may now cause the media program to fast forward or rewind just a few minutes or fractions of a minute. In other words, the "zoomed-in" scroll bar 160 allows the user to have finer control of the playback of the media program.

To enhance the navigational experience for the user, the fast forwarding or rewinding of the media program corresponding to the movement of the position indicator 170 along the scroll bar 160 may be accompanied by a continuous display of scenes of the media program corresponding to the location of the position indicator 170. In other words, as the position indicator 170 is dragged along the scroll bar 160, the scene of the media program is continuously updated to reflect the (new) current location of the position indicator 170. In this manner, the user can "slowly" navigate the media program to a desired time location without risking missing a desired scene.

As shown in FIG. 2, the respective time information associated with the position indicators 130/170 as well as the beginning and the end of the scroll bars 120/160 may also be displayed in the user interface 100A. Such detailed time information displayed in the user interface 100A further assists the user's navigation of the media program.

Figure 3:
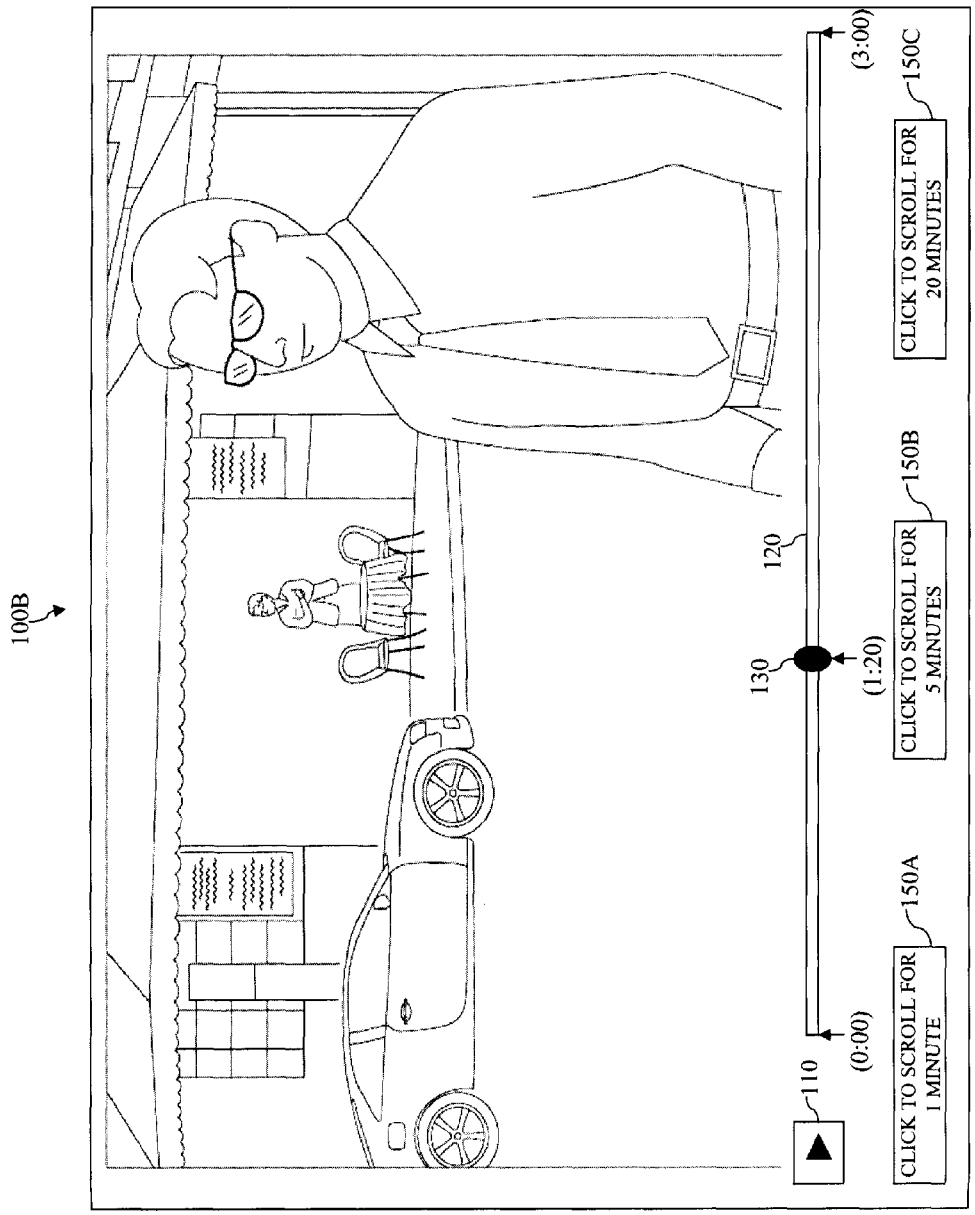
Figure 4:
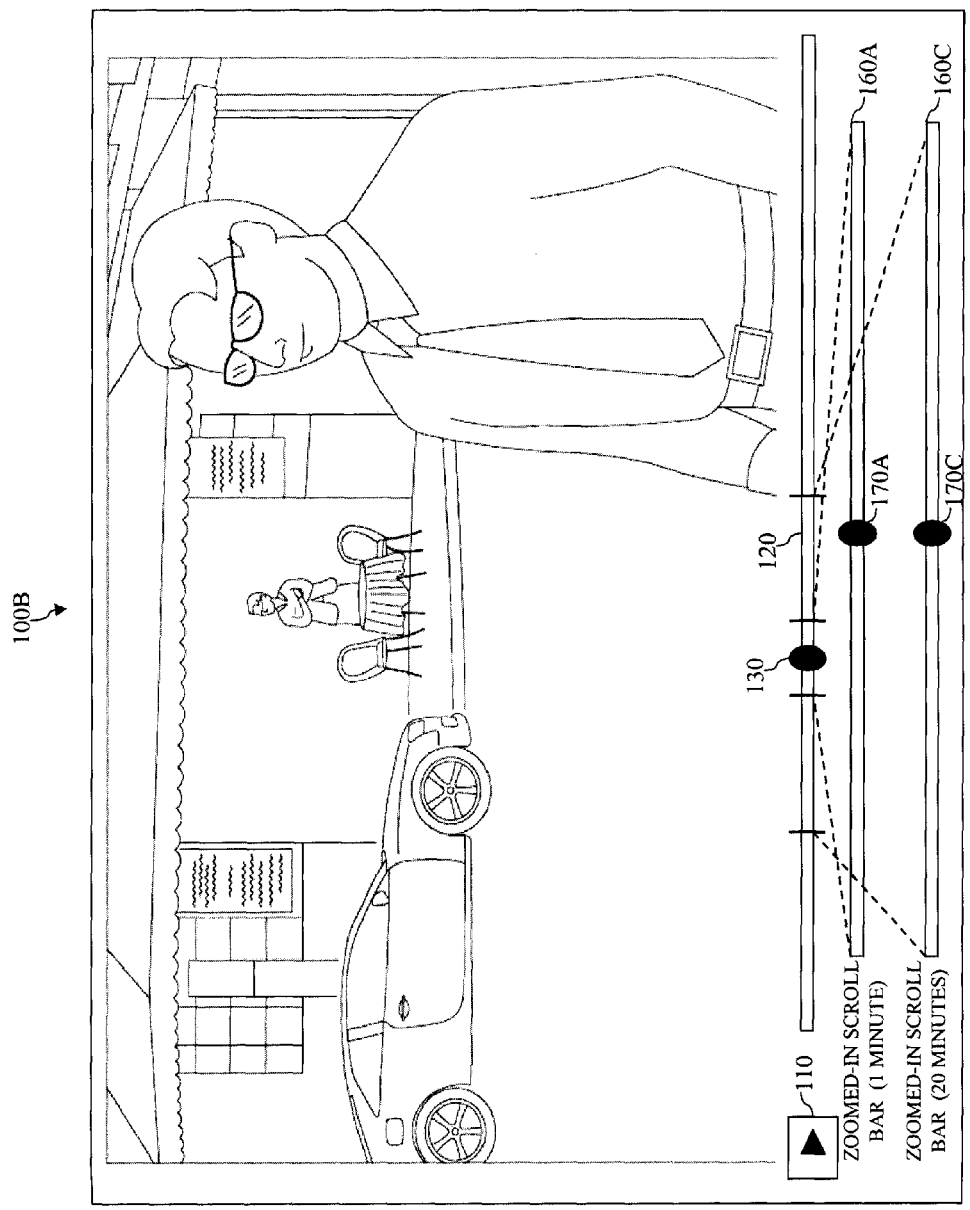

FIGS. 3-4 are screenshots of an alternative embodiment of a user interface 100B displaying a media program on a portable electronic device according to various aspects of the present disclosure. Referring to FIG. 3, a plurality of virtual icons/buttons 150 may be displayed in the user interface 100B. As an example, three of such virtual icons/buttons 150A, 150B, and 150C are shown. These icons/buttons 150A-150C may each be interactively activated by the user in a manner similarly to the icon/button 150 (shown in FIG. 1) to trigger the "zoomed-in" scrolling as discussed above. However, the icons/buttons 150A-150C herein may each correspond to a different time scale.

For example, if the icon/button 150A is clicked or pressed, a "zoomed-in" scroll bar similar to the scroll bar 160 (shown in FIG. 2) may be triggered, but this scroll bar triggered herein may correspond to only 1 minute of the media program. On the other hand, if the icon/button 150B is clicked or pressed, another "zoomed-in" scroll bar corresponding to 5 minutes of the media program may be triggered. If the icon/button 150C is clicked or pressed, yet another "zoomed-in" scroll bar corresponding to 20 minutes of the media program may be triggered. In various embodiments, the amount of time corresponding to each scroll bar may be set by the user. For example, a long press of each the icons/buttons 150A-150C may bring up another interactive virtual mechanism, such as a spin-able wheel or a text input field. The user may "spin the wheel" to increase or decrease the length of time corresponding to the respective scroll bar, or the user may just directly input such length of time into the text field.

In certain embodiments, these differently-time-scaled scroll bars may be triggered one at a time. In other embodiments, two or more of these differently-time-scaled scroll bars may be triggered simultaneously. For example, as shown in FIG. 4, the displays of the scroll bars 160A/160C and position indicators 170A/170C are both triggered by a detected clicking of the icons/buttons 150A/150C, respectively. The user may perform navigational tasks by either moving the position indicator 170A along the scroll bar 160A, or by moving the position indicator 170C along the scroll bar 160C.

The simultaneous display of multiple scroll bars (and their respective position indicators) allows for enhanced and more granular media playback control. For example, the user may perform a more "rapid" navigation by using the less "zoomed-in" scroll bar 160C first, so that an approximate time location may be identified. Thereafter, the user may perform a "slower" navigation by using the more "zoomed-in" scroll bar 160A, to zero-in on the exact desired scene. In other words, the embodiment illustrated in FIG. 4 allows the user to perform a "coarse" navigation followed by a "fine" navigation in order to find the desired scene efficiently.

Figure 5:
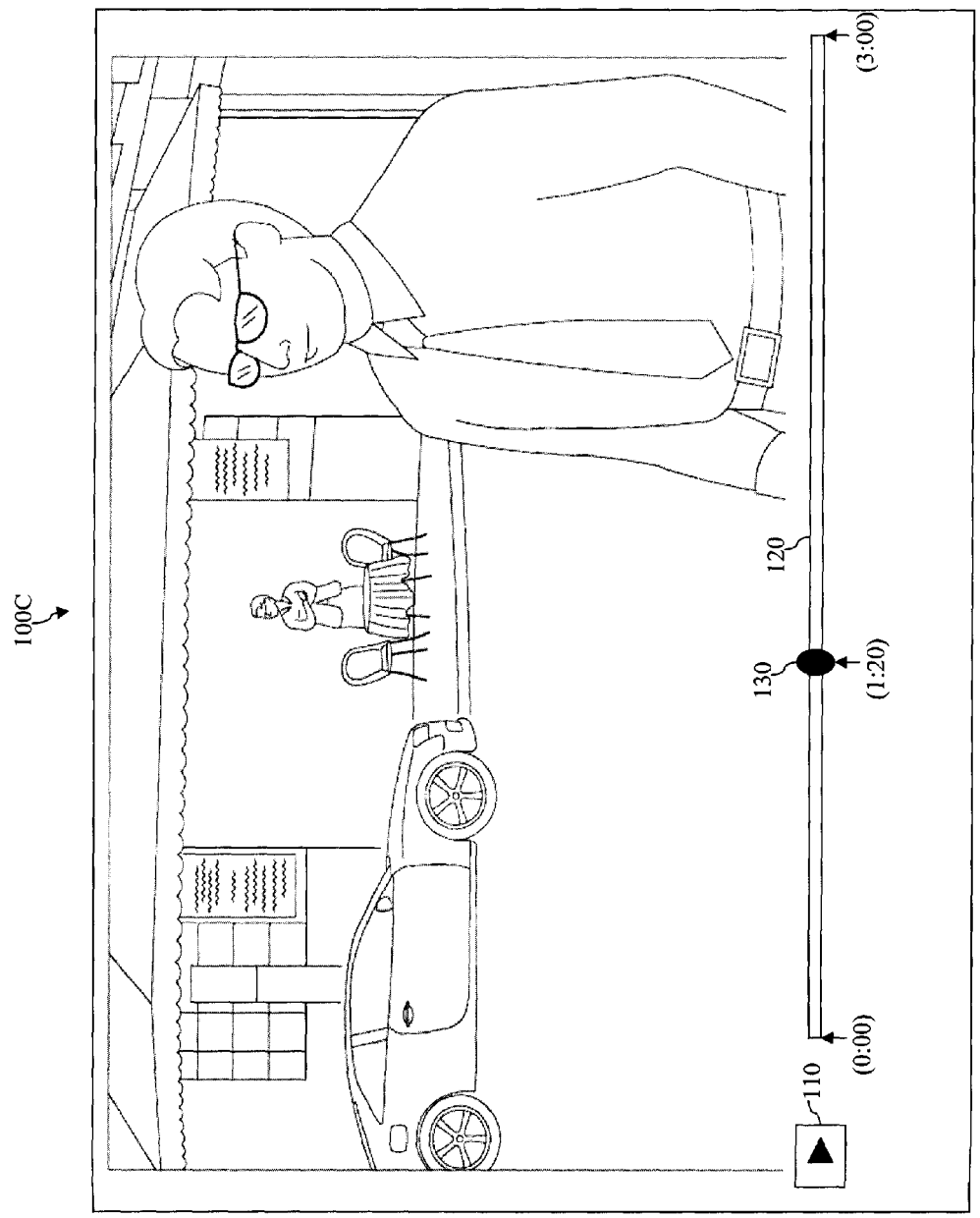

Though the embodiments discussed above and shown in FIGS. 1-4 trigger the "zoomed-in" scroll bar(s) 160 by detecting a user click of an icon/button 150, it is understood that other mechanisms may be employed to trigger the scroll bar(s) 160 as well. For example, referring to FIG. 5, an alternative embodiment of user interface 100C need not use any specific icons/buttons to trigger the "zoomed-in" scroll bar. Rather, a "zoomed-in" scroll bar may be conditionally triggered in response to a detected movement speed of the position indicator 130 along the scroll bar 120.

In more detail, the user interface 100C may predefine a reference speed for the position indicator 130. For example, the reference speed may be predefined to be X millimeters-per-second, which may be automatically programmed within the user interface 100C or may be manually defined by the user (for example, in a "settings" menu of the user interface 100C). The detected movement speed of the position indicator 130 (in response to user input) along the scroll bar 120 is compared with the reference speed. If the detected movement speed of the position indicator is less than the reference speed, that indicates that the user wishes to navigate through the media program slowly in order to find a desired scene of the media program. Consequently, a "zoomed-in" scroll bar similar to the scroll bar 160 shown in FIG. 2 may be triggered to allow the user perform navigational tasks in a "zoomed-in" time scale associated with such scroll bar.

On the other hand, if the detected movement speed of the position indicator 130 is greater than the reference speed, that indicates that the user wishes to navigate through the media program quickly and therefore does not need the "zoomed-in" scroll bar such as the scroll bar 160 shown in FIG. 2. Consequently, no such "zoomed-in" scroll bar will be triggered, and the user may perform navigational tasks in a "regular" time scale associated with the scroll bar 120 of FIG. 5. In the manner discussed above, the embodiment of the user interface 100C shown in FIG. 5 determines the needs of the user in response to a detected gesture-based input from the user, and thereafter finds an appropriate navigation environment for the user automatically.

It is understood that the embodiment discussed above with reference to FIG. 5 need not be restricted to just one reference speed. Instead, the user interface 100C may define (or allow the user to define) a plurality of reference speeds. The actual detected movement speed of the position indicator 130 is compared with these multiple reference speeds so as to find a most suitable "zoomed-in" scroll bar (or non-at-all) for the user to perform the navigation of the media program. For example, the user interface 100C may predefine three reference speeds: speed 1, speed 2, and speed 3, where speed 1<speed 2<speed 3. If the detected actual movement speed of the position indicator 130 is less than speed 1, that may indicate that the user wishes to perform navigation at a slowest (or finest) pace. Consequently, a first scroll bar having a smallest (or most "zoomed-in") time scale may be triggered. For example, the first scroll bar may be associated with a time scale of 1 minute.

If the detected actual movement speed of the position indicator 130 is greater than speed 1 but less than speed 2, that may indicate that the user wishes to perform navigation at a somewhat-slow-but-not-too-slow pace. Consequently, a second scroll bar having a time scale that is greater than the time scale associated with the first scroll bar may be triggered. For example, the second scroll bar may be associated with a time scale of 5 minutes.

If the detected actual movement speed of the position indicator 130 is greater than speed 1 and speed 2 but less than speed 3, that may indicate that the user wishes to perform navigation at a pace that is just slightly slower than normal. Consequently, a third scroll bar having a time scale that is greater than the time scales associated with the first and second scroll bars may be triggered. For example, the third scroll bar may be associated with a time scale of 20 minutes.

If the detected actual movement speed of the position indicator 130 is greater than the reference speed 3, that may indicate that the user wishes to perform navigation at a regular pace. Consequently, no "zoomed-in" scroll bar is triggered. The user may instead perform navigation on a scroll bar like the scroll bar 120, which has a time scale equal to the entire duration of the media program.

Figure 6:
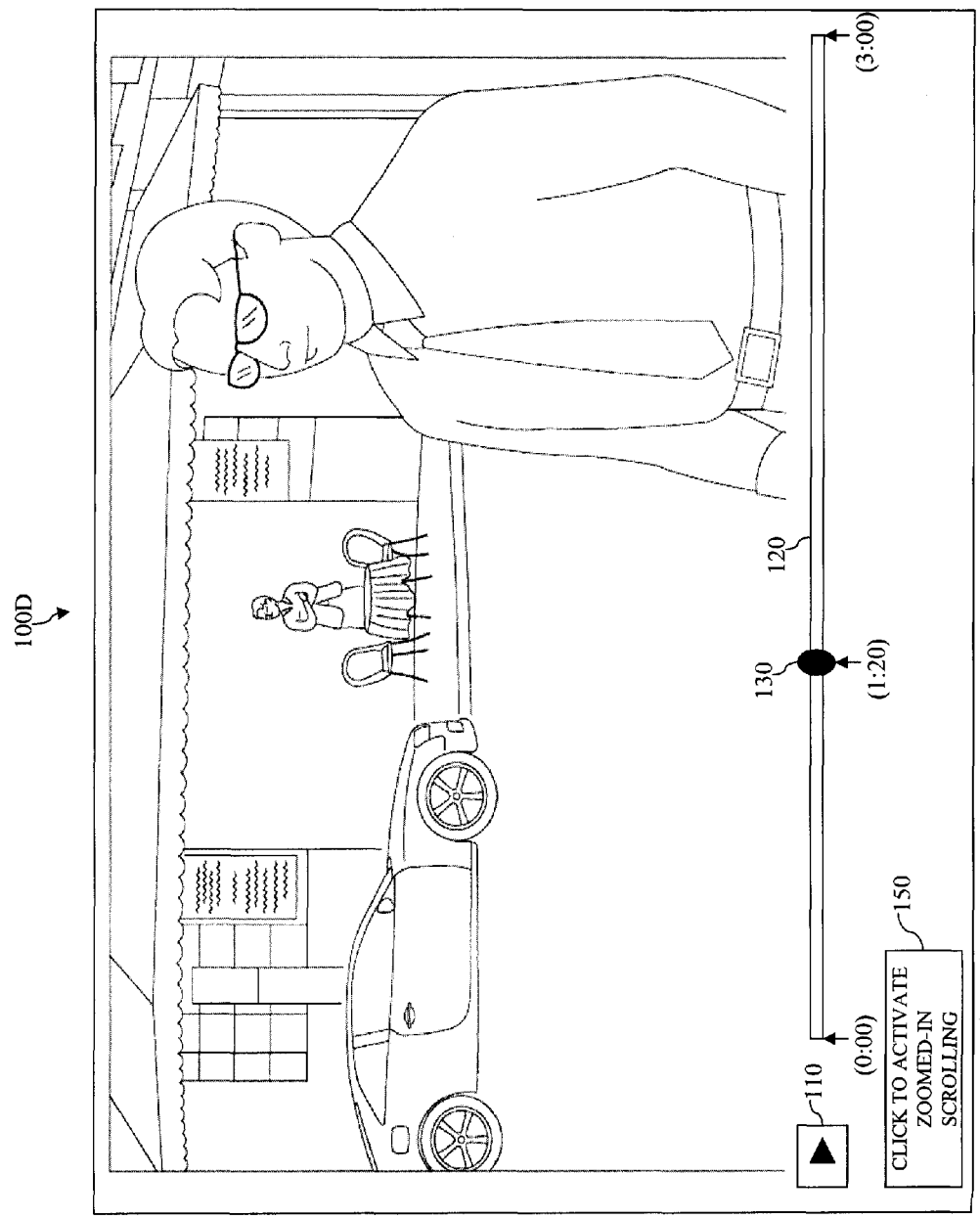

The embodiments of the user interface 100 discussed above with reference to FIGS. 1-5 involve triggering the display of a "zoomed-in" scroll bar (for example the scroll bar 160) that is separate from a "main" scroll bar (for example the scroll bar 120). However, it is understood that the concepts discussed above may apply also to a user interface without triggering a separate "zoomed-in" scroll bar. Referring to FIG. 6, the user interface 100 may appear substantially the same as the user interface 100A at this stage. In other words, the user interface 100D may include a "regular" scroll bar 120 and a position indicator 130 located thereon, as well as a virtual icon/button 150 that informs the user that "zoomed-in" scrolling is available and can be activated.

Figure 7:
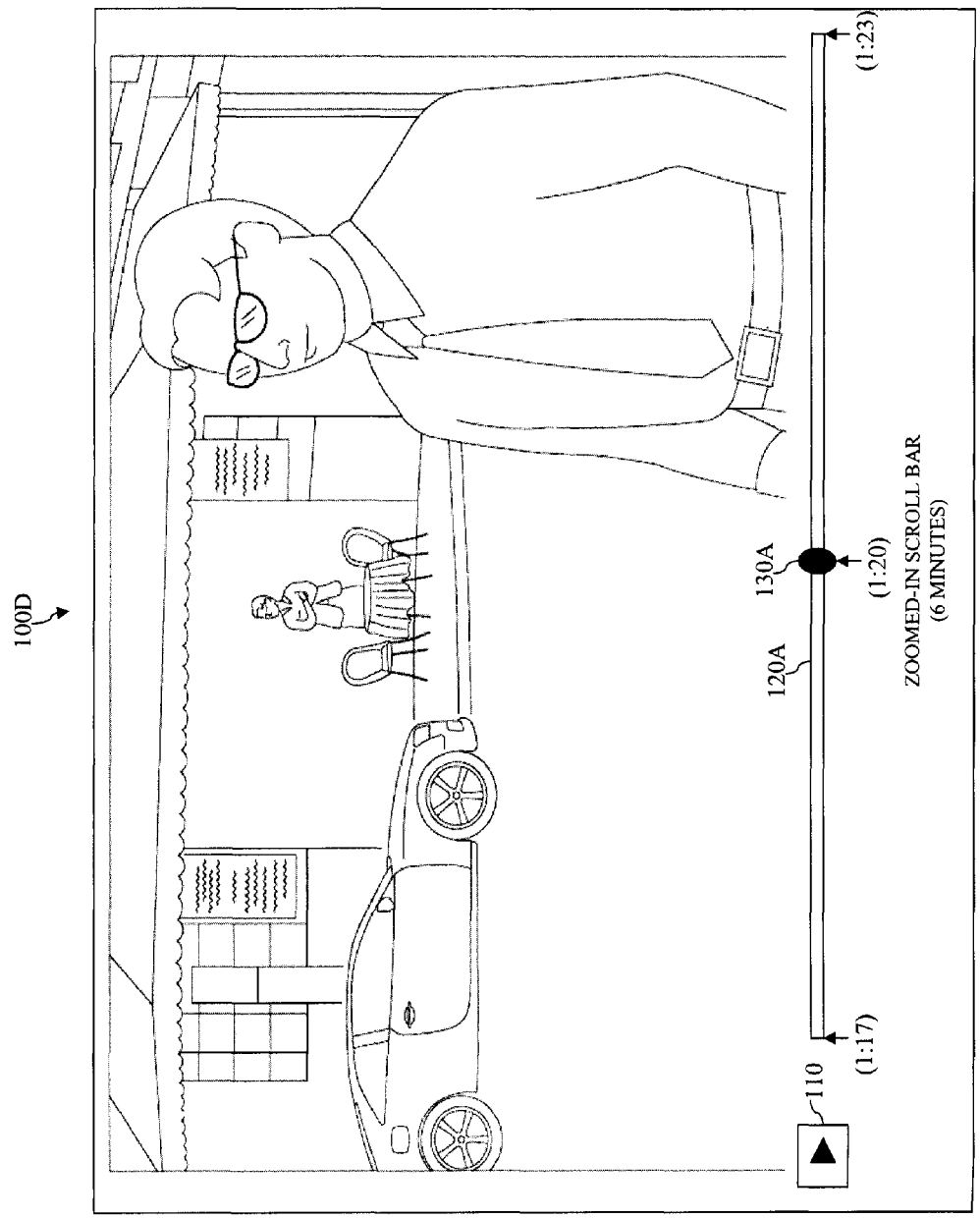

Once the user interface 100D detects that the user has clicked on the icon/button 150, it will display a different stage of the user interface 100D, as illustrated in FIG. 7. As is shown in FIG. 7, rather than showing a "zoomed-in" scroll bar separate from the "regular" scroll bar 120, the user interface 100D replaces the scroll bar 120 with a "zoomed-in" version of itself, designated as a scroll bar 120A (which contains a position indicator 130A). In other words, whereas the regular scroll bar 120 corresponds to a time scale equal to a total duration of the media program (3 hours, for example), the zoomed-in version 120A corresponds only to a fraction of the time scale (6 minutes, for example). In some embodiments, the position indicator 130A is initially placed at the center of the scroll bar 120A. The user may once again perform fine navigational tasks using the zoomed-in scroll bar 120A and the position indicator 130A. A movement of the position indicator 130A to the left results in a rewinding of the media program, and a movement of the position indicator 130A to the right results in a fast forwarding of the media program.

It is understood that the user interface 100D FIG. 7 may incorporate other aspects of the user interfaces 100A-100C discussed above to arrive at various other alternative embodiments. For example, in one embodiment, multiple virtual icons/buttons similar to those shown in FIG. 3 may be employed by the user interface 100D, so as to offer the user an option to choose a desired zoomed-in time scale to perform navigational tasks. As another example, in another embodiment, depending on the actual detected movement speed of the position indicator 130A, zoomed-in scroll bars 120A corresponding to different time scales may be triggered to replace the regular scroll bar 120, in a manner similar to the concepts discussed above with reference to the user interface 100C of FIG. 5.

Figure 8:
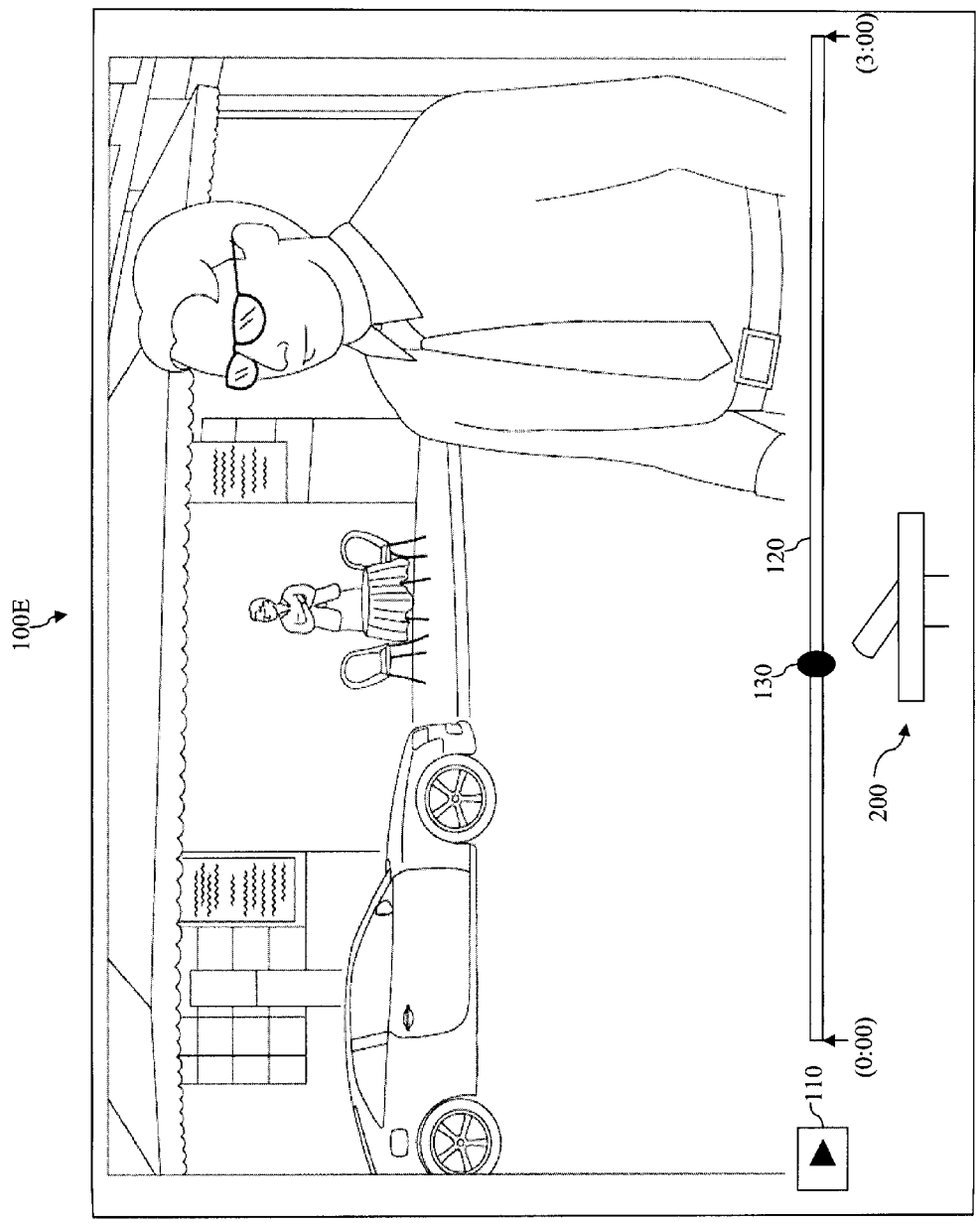

FIG. 8 shows a screenshot of a user interface 100E according to another alternative embodiment of the present disclosure. In this embodiment, the user interface 100E employs a virtual toggle 200 to carry out navigation tasks. The virtual toggle 200 can be flipped in the left direction, which results in a rewinding of the media program. The virtual toggle 200 can be flipped in the right direction, which results in a fast forwarding of the media program. The degree (i.e., the amount of tilt) in which the toggle 200 is flipped in either direction corresponds to the speed in which the media program is fast forwarded or rewound. Thus, if the user wishes to navigate through the media program rapidly, he can flip the toggle 200 and hold it in an extreme tilt angle. For example, the tilt angle of the toggle may approach 90 degrees, where a vertical line would correspond to a 0 degree. On the other hand, if the user wishes to navigation through the media program more slowly, he can flip the toggle 200 and hold it in a subtle tilt angle. For example, the tilt angle of the toggle may not deviate much from the 0 degree. The user interface 100E is configured to continuously monitor the amount of tilt of the toggle 200. As the user changes the amount of tilt of the toggle, the user interface 100E will either increase or slow down the navigation speed accordingly in a substantially instantaneous manner.

Of course, the toggle 200 may also be implemented in a manner such that it is flipped up or down rather than left or right. In that case, the up direction may correspond to a rewinding of the media program, and the down direction may correspond to a fast forwarding of the media program, or vice versa.

Figure 9:
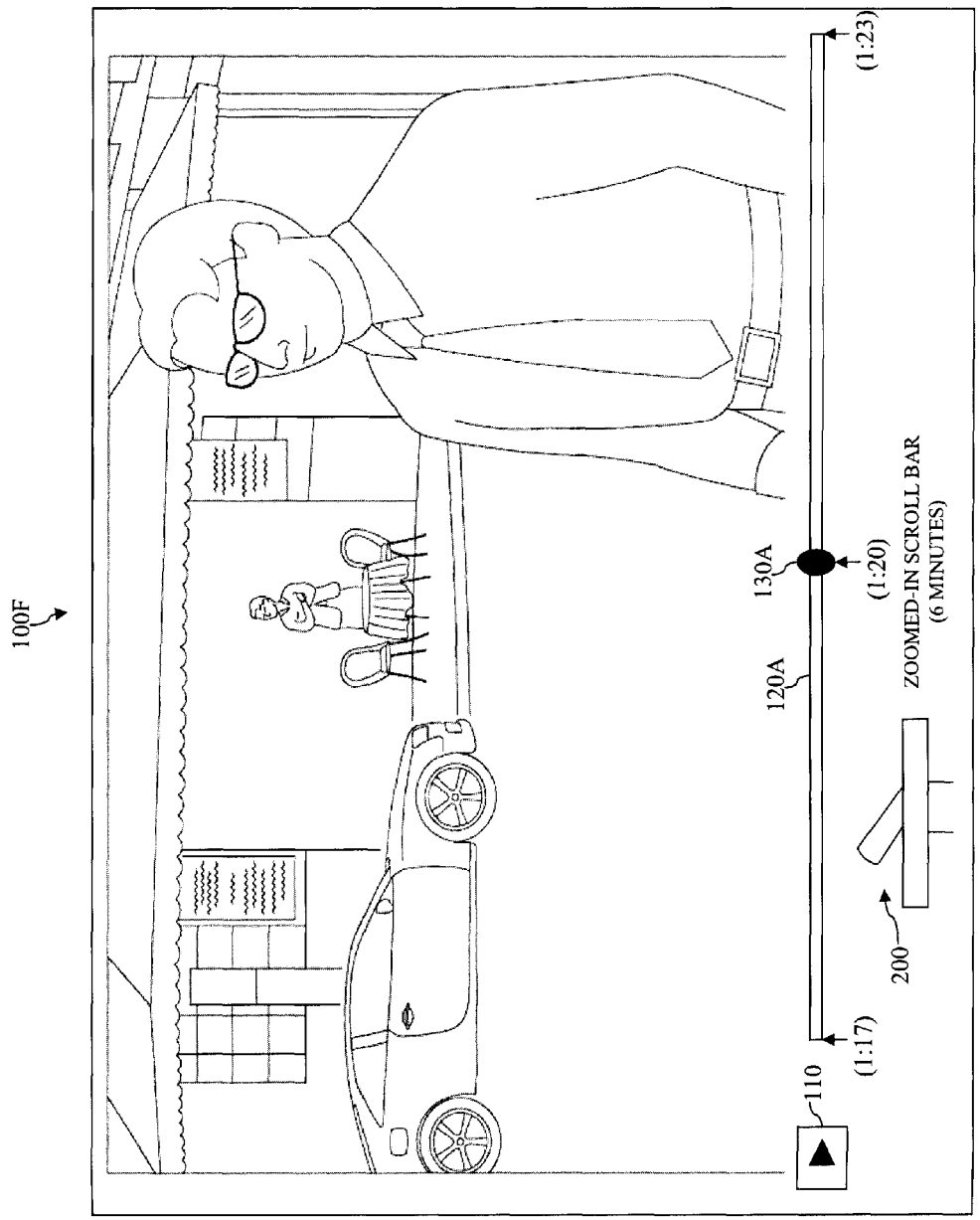

The toggle 200 can also be integrated in the embodiments discussed above where a zoomed-in scroll bar is utilized. For example, referring to FIG. 9, the toggle 200 is implemented in a user interface 100F that also includes a zoomed-in scroll bar 120A. The user may use either flip the toggle 200 to perform navigation, or move the position indicator 130A along the scroll bar 120A to perform navigation. In a similar manner, each of the embodiments of the user interfaces 100A-100D discussed above may integrate one or more instances of the toggle 200 therein. In embodiments where multiple toggles 200 are used, each toggle 200 may correspond to a different predefined speed or a predefined range of speeds.

Figure 10:
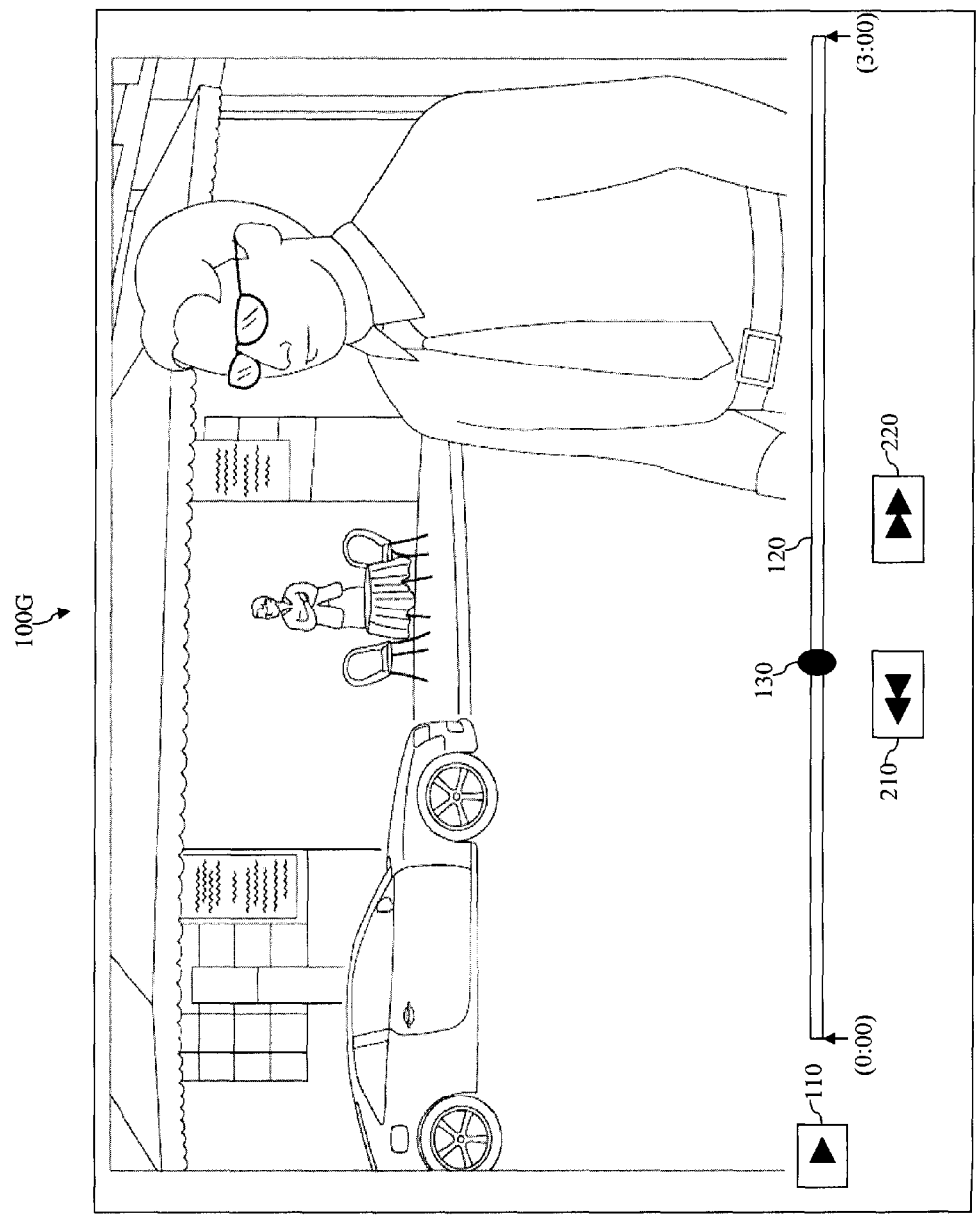

It is also understood that the toggle 200 is merely an example of a virtual on-screen control mechanism that may be used to facilitate user navigation of the media program. In alternative embodiments, other virtual on-screen control mechanisms may be used instead of, or in addition to, the toggle 200. For example, referring to FIG. 10, a user interface 100G uses a virtual rewind button 210 and a virtual fast forward button 220 to perform the rewinding and fast forwarding of the media program, respectively. In some embodiments, the speed at which the media program is rewound or fast forwarded is a function of the amount of time in which the button 210 or 220 is pressed (i.e., held down), respectively. For example, if the button 210 is tapped quickly, it results in a slow rewinding of the media program, perhaps by a few scenes. As the button 210 is held down longer, the pace at which the media program is rewound increases. The user may let go of the button 210 to stop the rewinding. The fast forwarding of the media program is done in a similar manner.

Figure 11:
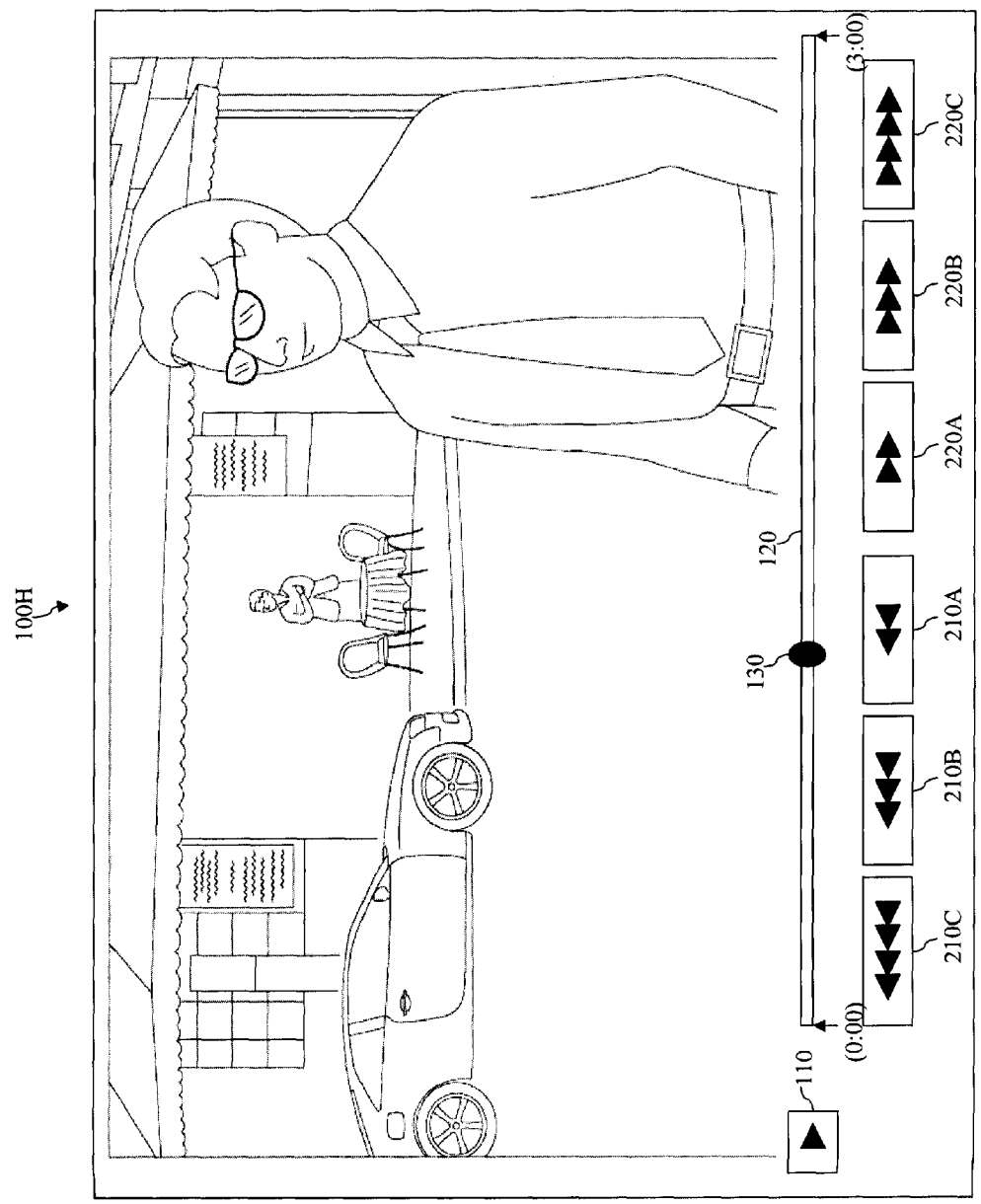

FIG. 11 illustrates another user interface 100H according to yet another embodiment. In the user interface 100H, a plurality of virtual rewind buttons 210A/B/C and a plurality of virtual fast forward buttons 220A/B/C are used to perform navigation through the media program. Each virtual rewind button 210A/B/C is associated with a different rewind speed, and each fast forward button 220A/B/C is associated with a different fast forward speed. For example, the rewind button 210A may be pressed to start rewinding of the media program at a first speed, the rewind button 210B may be pressed to start rewinding of the media program at a second speed greater than the first speed, and the rewind button 210C may be pressed to start rewinding of the media program at a third speed greater than the first and second speeds.

Similarly, the fast forward button 220A may be pressed to start fast forwarding of the media program at a first speed, the fast forward button 220B may be pressed to start fast forwarding of the media program at a second speed greater than the first speed, and the fast forward button 220C may be pressed to start fast forwarding of the media program at a third speed greater than the first and second speeds. Although three rewind buttons 210A/B/C and three fast forward buttons 220A/B/C are used in the example illustrated in FIG. 11, any other number of rewind or fast forward buttons may be used in alternative embodiments.

Figure 12:
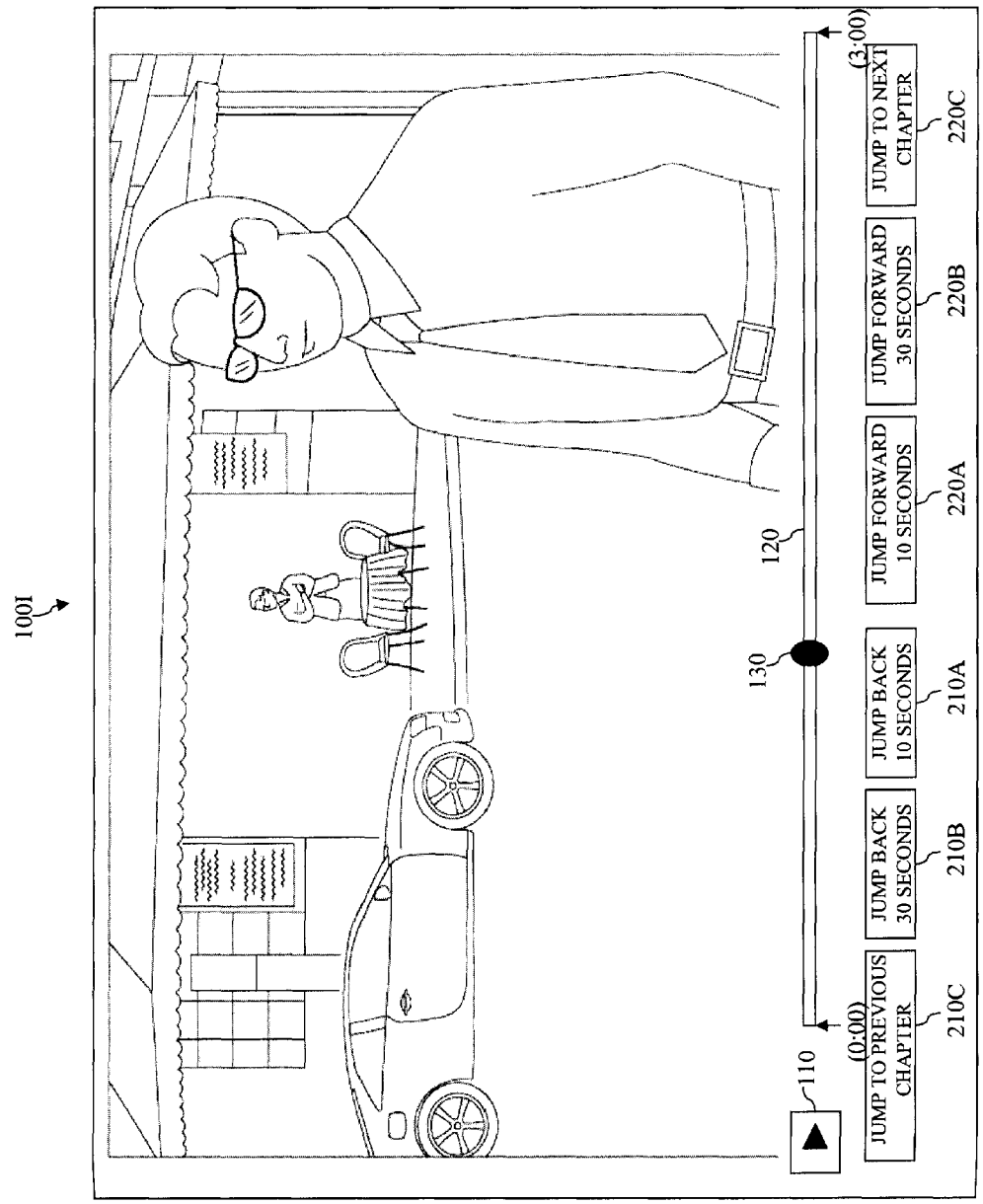

FIG. 12 illustrates yet another user interface 100I according to yet another embodiment. In the user interface 100H, a plurality of virtual on-screen control mechanisms are illustrated as a "jump back 10 seconds" button 210A, a "jump back 30 seconds" button 210B, and a "jump to previous chapter" button 210C, a "jump forward 10 seconds" button 220A, a "jump forward 30 seconds" button 220B, and a "jump to next chapter" button 220C. As the names of these buttons imply, a click of the "jump back 10 seconds" button 210A rewinds the media program by 10 seconds, a click of the "jump back 30 seconds" button 210B rewinds the media program by 30 seconds, and a click of the "jump to previous chapter" button 210C rewinds the media program to the start of a previous chapter (for example, if the media program contains a plurality of chapters), a click of the "jump forward 10 seconds" button 220A fast forwards the media program by 10 seconds, a click of the "jump forward 30 seconds" button 220B fast forward the media program by 30 seconds, and a click of the "jump to next chapter" button 220C fast forwards the media program to the start of a subsequent chapter. Meanwhile, the scroll bar 120 (and the indicator 130) may still be used in conjunction with these on-screen control mechanisms 210A-C and 220A-C to perform navigational tasks.

Although not specifically illustrated, other embodiments of the user interface 100I may employ additional virtual on-screen control mechanisms to further facilitate the navigation through the media program. As an example, a user input mechanism such as a text field may be used, where a user may input numbers indicating the desired time location of the media program that he wishes to see. For instance, the user may input "1:20:25" to indicating that he wishes to jump directly to the scene of the media program at the time location of 1 hour 20 minutes and 25 seconds. In addition to text input fields, virtual mechanisms such as spin-able wheels may also be used to select the desired numbers for the target time location. Other suitable virtual mechanisms may also be used to accomplish this task as well.

Figure 13:
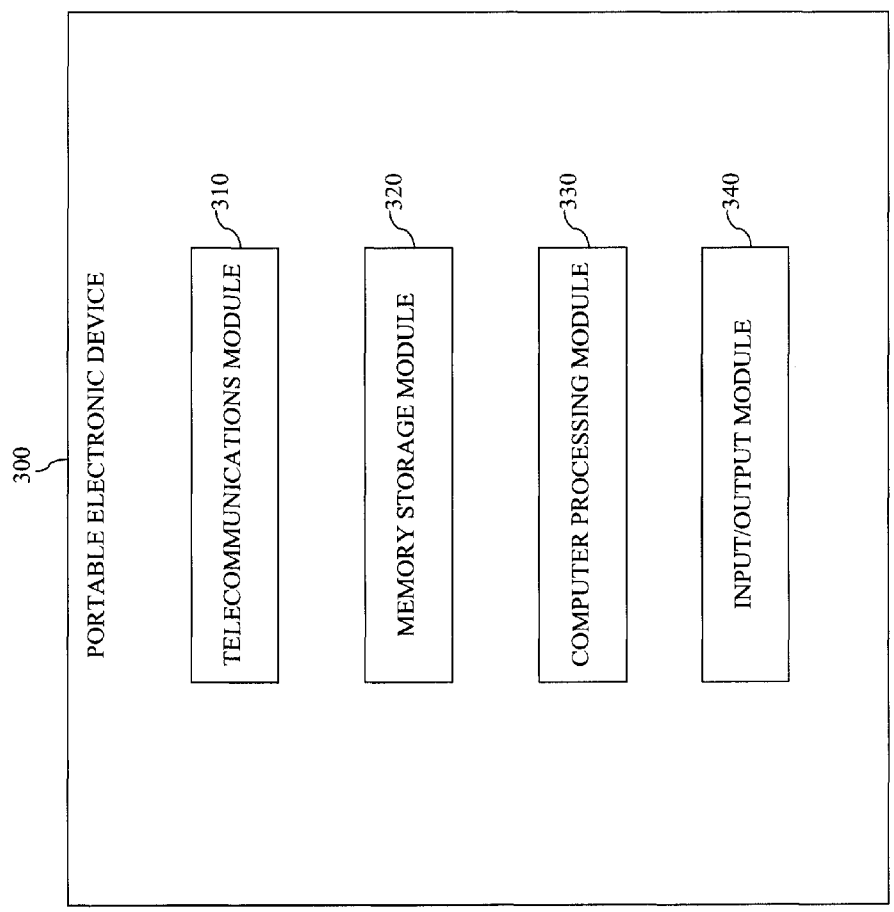
FIG. 13 is a block diagram of an example portable electronic device for displaying and navigating through the media program according to various aspects of the present disclosure.

FIG. 13 is a simplified block diagram of an embodiment of a portable electronic device 300 according to the various aspects of the present disclosure. The portable electronic device 300 includes a telecommunications module 310. The telecommunications module 310 contains various electronic circuitry components configured to conduct telecommunications with one or more external devices. The electronic circuitry components allow the telecommunications module 310 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the telecommunications module 310 includes antennas, filters, low-noise amplifiers, digital-to-analog (DAC) converters, analog-to-digital (ADC) converters, and transceivers. The transceivers may further include circuitry components such as mixers, amplifiers, oscillators, phase-locked loops (PLLs), and/or filters. Some of these electronic circuitry components may be integrated into a single discrete device or an integrated circuit (IC) chip.

The portable electronic device 300 may include a computer memory storage module 320. The memory storage module 320 may contain various forms of digital memory, such as hard disks, FLASH, SRAM, DRAM, ROM, EPROM, memory chips or cartridges, etc. Computer programming code may be permanently or temporarily stored in the memory storage module 320, for example.

The portable electronic device 300 may also include a computer processing module 330. The computer processing module 330 may contain one or more central processing units (CPUs), graphics processing units (GPUs), or digital signal processors (DSPs), which may each be implemented using various digital circuit blocks (including logic gates such as AND, OR, NAND, NOR, XOR gates, etc) along with certain software code. The computer processing module 330 may be used to execute the computer programming code stored in the memory storage module 320.

The portable electronic device 300 may also include an input/output module 340. The input/output module 340 may include one or more touch-sensitive screens, physical and/or virtual buttons (such as power and volume buttons) on or off the touch-sensitive screen, physical and/or virtual keyboards, mouse, track balls, speakers, microphones, light-sensors, light-emitting diodes (LEDs), communications ports (such as USB or HDMI ports), joy-sticks, image-capture devices (for example cameras), etc. In some embodiments, the touch-sensitive screen may be used to display the media program discussed above. User navigation of the media program according to the various embodiments discussed above may also be accomplished using the touch-sensitive screen and/or other components of the input/output module 340.

Figure 14:
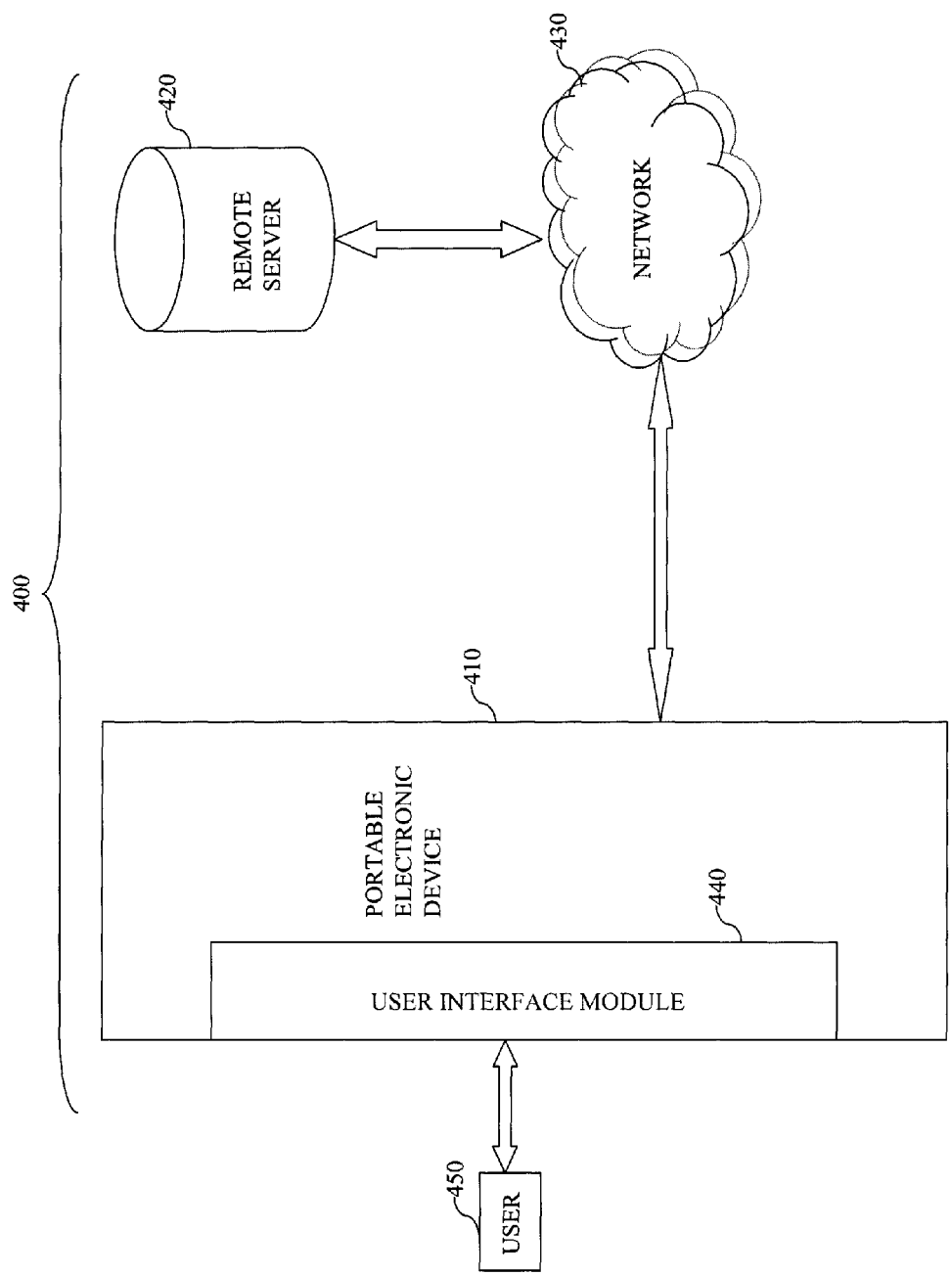
FIG. 14-15 are block diagrams of different embodiments of an example system for displaying and navigating through the media program according to various aspects of the present disclosure.

FIG. 14 is a simplified diagrammatic view of a system 400 that may be used to perform certain aspects of the media program navigation of the present disclosure discussed above. In some embodiments, the system 400 may include the portable electronic device 410. The portable electronic device 410 may be implemented as an embodiment of the portable electronic device 300 of FIG. 13. In some embodiments, the portable electronic device 410 includes a tablet computer or a mobile telephone.

The system 400 also includes a remote server 420. The remote server 420 may be run/hosted/operated by a media service provider such as NETFLIX®, AMAZON®, HULU®, COMCAST, VUDU, REDBOX®, or another suitable media service provider that offer various types of video streaming or downloading services for their subscribers. The remote server 420 may be implemented in a "cloud" computing environment and may include one or more databases that store a plurality of media programs such as movies, documentaries, music videos, podcasts, soundtracks, educational programs, sporting events, artistic performances, or any other type of suitable audio/video digital file that can be played on the portable electronic device 410.

The portable electronic device 410 and the remote server 420 may be communicatively coupled together through a network 430. The network 430 may include cellular towers, routers, switches, hubs, repeaters, storage units, cabling (such as fiber-optic cabling or telephone cabling), and other suitable devices. The network 430 may be implemented using any of the suitable wired or wireless networking protocols. The portable electronic device 410 and the remote server 420 may also be able to communicate with other devices on the network 430 and either carry out instructions received from the network, or send instructions through the network to these external devices to be carried out.

To facilitate user interaction with its offered services, the media servicer provider (that hosts or operates the remote server 420) may provide a user interface module 440. The user interface module 440 may include software programming code and may be installed on the portable electronic device 410 (for example in a memory storage module). In some embodiments, the user interface module 440 may include a downloadable "app", for example an app that is downloadable through a suitable service such as APPLE's® ITUNES®, THE APP STORE® from APPLE®, ANDROID's® PLAY STORE®, AMAZON's® INSTANT VIDEO®, MICROSOFT's® WINDOWS STORE®, RESEARCH IN MOTION's® BLACKBERRY APP WORLD®, etc. In the embodiment shown, the user interface module 440 includes an instance of the "app" that has been downloaded and installed on the portable electronic device 440.

A user 450 may interact with the system 400 by sending instructions to the portable electronic device 410 through the user interface module 440. For example, the user 450 may be a subscriber of the services offered by the service provider running/hosting/operating the remote server 420. The user 450 may attempt to log in to the remote server 420 by launching the "app" of the user interface 440. The user's login credentials are electrically sent to the remote server 420 through the network 430. After verifying the user login credentials, the remote server 420 may instruct the user interface module 440 to display a suitable home screen, through which the user 450 may select a desired media program to watch. The media program selection request from the user 450 is once again sent to the remote server 420 through the network 430. In response to the user selection request, the remote server 420 may begin sending electric packets (of the digital file corresponding to the requested media program) to the portable electronic device 410 through the network 430. As such, the user 450 may be able to stream his target media program of choice. Alternatively, the user 450 may download the selected media program in its entirety and may then play the downloaded media program at any time he wishes. User navigation of the media program according to the embodiments discussed above with reference to FIGS. 1-12 may be implemented through, or as a part of, the user interface module 440.

It is understood that the embodiment of the system 400 shown in FIG. 14 is merely a simplified example of enabling user navigation through a media program and is therefore not intended to be limiting. Other embodiments may be implemented that utilize different types of streaming architectures, or even with no streaming at all. As discussed above, the various aspects of the user navigation through a media program may still apply to media programs that have already been downloaded to a portable electronic device such as the portable electronic device 410 of FIG. 14.

Figure 15:
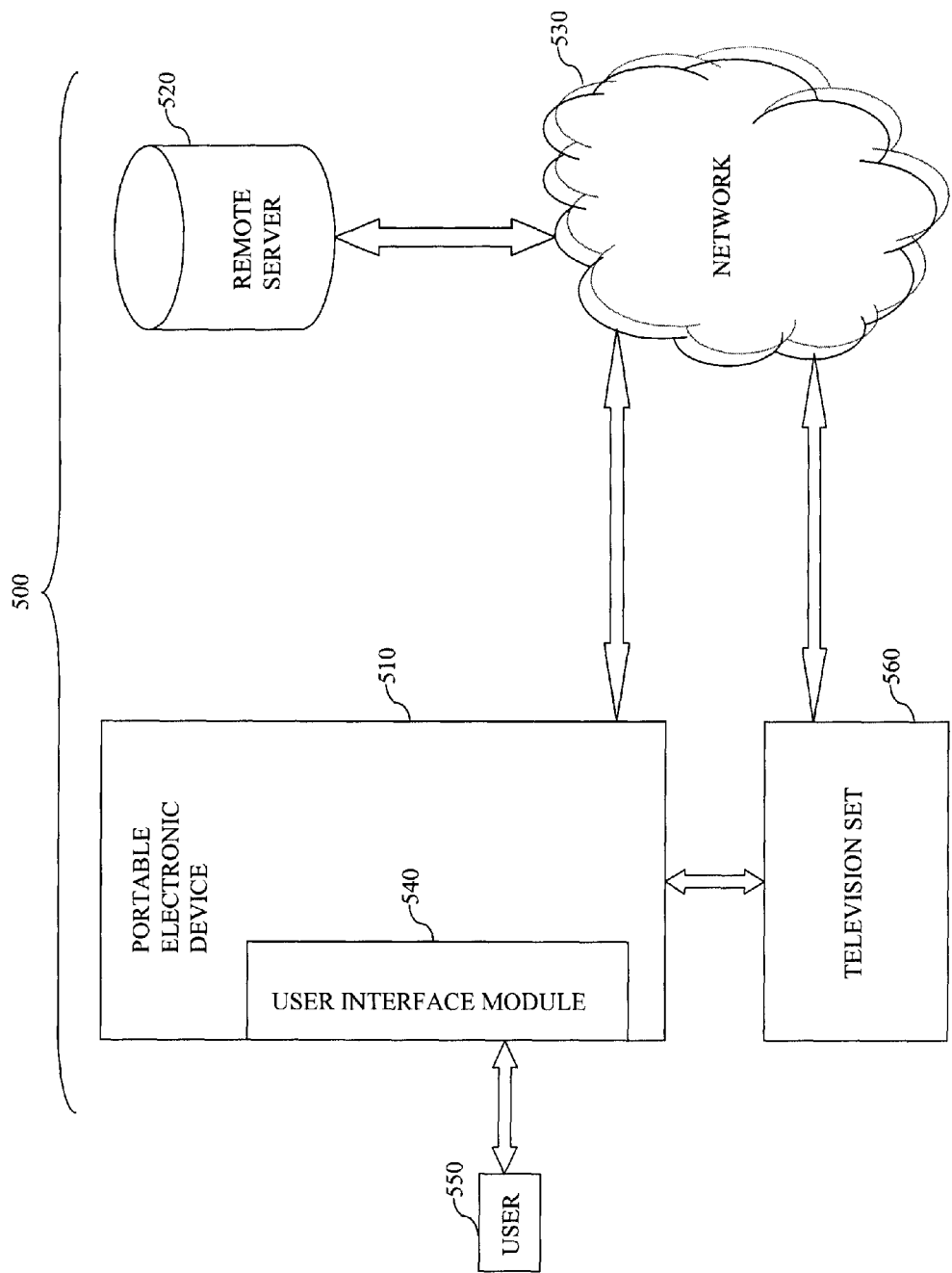

FIG. 15 is a simplified diagrammatic view of another system 500 that may be used to perform certain aspects of the media program navigation of the present disclosure discussed above. The system 500 is similar to the system 400 of FIG. 14 in certain aspects. For example, the system includes a remote server 520 that is similar to the remote server 420, as well as a network 530 that is similar to the network 430. However, in the system 500, the media program is streamed to (or downloaded first and later played on) a television set 560, rather than to the portable electronic device 510. The television set 560 may include components (for example, transceivers) that allow the television set 560 to be communicatively coupled to the portable electronic device and the network 530. The portable electronic device 510 may be configured to control the operation of the television set 560. In that sense, the portable electronic device 510 may be viewed as an enhanced TV remote. The portable electronic device 510 may still be implemented to include a tablet computer or a mobile telephone, or may just include a simple control panel or control pad having a touch screen. An instance of the user interface module 540 may be installed on either the portable electronic device 540 or on the television set 560. Once again, according to various aspects of the present disclosure discussed above with reference to FIGS. 1-12, a user 550 may interact with the portable electronic device 510 to perform various navigational tasks for a media program that is played on the television set 560.

In certain other alternative embodiments, the media program may be downloaded to a storage device (for example on a desktop or a laptop computer) under the user's possession. The storage device may be configured to electronically communicate with the television set 560 and the portable electronic device. Thus, the media program may be streamed to the television set 560 through a local network (which may be implemented as a part of the network 530) from such storage device. Once again, the various aspects of navigation control discussed above may still apply to such set-up.

Figure 16:
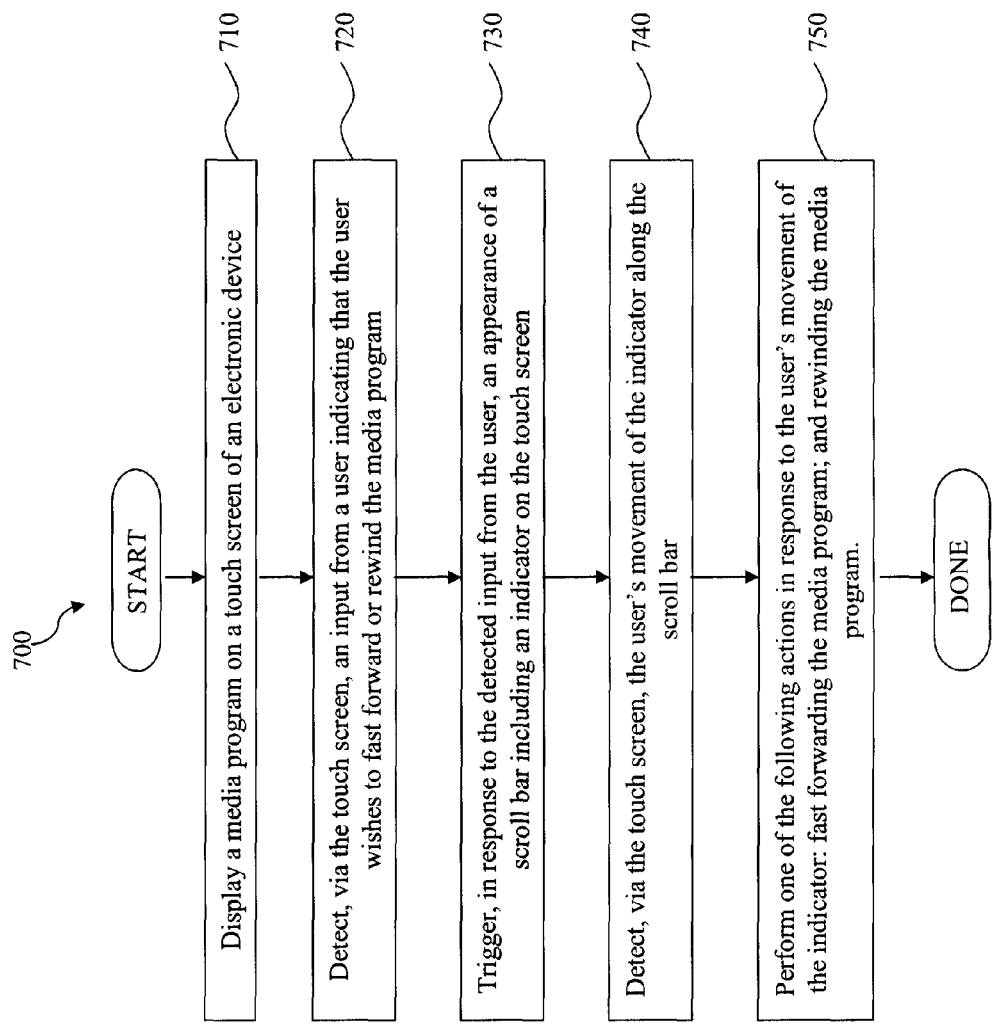
FIG. 16 is an example method for displaying and navigating through the media program according to various aspects of the present disclosure

FIG. 16 is a flowchart of an example method 700 for managing media playback according to the various aspects of the present disclosure. The method 700 includes a step 710, in which a media program is displayed on a touch screen of an electronic device. In some embodiments, the step 710 is performed by streaming the media program to the electronic device from an online database via a wireless or wired telecommunications protocol. In other embodiments, the step 710 is performed by playing the media program that is stored locally on the electronic device.

The method 700 includes a step 720, in which an input from a user is detected via the touch screen. The input from the user indicates that the user wishes to fast forward or rewind the media program. In some embodiments, the detection of user input includes detecting a press or a click of a virtual button the touch screen. In some embodiments, a plurality of icons is displayed on the touch screen, where the virtual button is one of the icons. The icons are configured to trigger the appearance of the scroll bar in response to a gesture-based user input. The icons each correspond to a respective scroll bar having a different fraction of the total duration of the media program. In other embodiments, the detection of user input includes detecting a voice command from the user.

The method 700 includes a step 730, in which an appearance of a scroll bar including an indicator on the touch screen is triggered in response to the detected input from the user. The indicator is configured to be moved along the scroll bar. A length of the scroll bar represents a predefined amount of time that is a fraction of a total duration of the media program. A position of the indicator relative to the scroll bar corresponds to a time location of the media program. In some embodiments, the triggering includes displaying a plurality of the scroll bars in response to detecting the gesture-based user input for the icons associated with the plurality of the scroll bars discussed above in certain embodiments of the step 720.

In some embodiments, the scroll bar is a second scroll bar and the indicator is a second indicator, and wherein the detecting of step 720 and the triggering of step 730 are performed in a manner to include the following steps:

detecting a user gesture performed on the touch screen;
    displaying a first scroll bar including a first indicator on the touch screen, wherein the first indicator is configured to be moved along the first scroll bar, wherein a length of the first scroll bar represents the total duration of the media program;
    detecting, via the touch screen, the user's movement of the first indicator along the first scroll bar;
    measuring a speed of the first indicator;
    performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and
    triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the triggering of step 730 is performed in a manner such that the indicator is initially positioned in a center of the scroll bar, and wherein a movement of the indicator in a first direction corresponds to a rewinding of the media program, and wherein a movement of the indicator in a second direction opposite the first direction corresponds to a fast forwarding of the media program.

The method 700 includes a step 740, in which the user's movement of the indicator along the scroll bar is detected via the touch screen.

The method 700 includes a step 750, in which one of the following actions is performed in response to the user's movement of the indicator: fast forwarding the media program; and rewinding the media program.

It is understood that the method may include additional steps performed before, during, or after the steps 710-750 discussed above. However, for the sake of simplicity, these additional steps are not described in detail herein.

One of the broader forms of the present disclosure involves an electronic device. The electronic device includes: a touchscreen configured to receive gestured-based input from a user; a memory storage component configured to store computer programming code; and a computer processor configured to execute the computer programming code to perform the following: displaying a media program on the touch screen; detecting, via the touch screen, the gesture-based input from the user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

In some embodiments, the computer programming code, when executed, further performs: detecting, via the touch screen, the user's movement of the indicator along the scroll bar; and performing one of the following actions in response to the user's movement of the indicator: fast forwarding the media program; and rewinding the media program.

In some embodiments, the computer programming code for performing the fast forwarding and the rewinding include computer programming code for executing the fast forwarding and the rewinding in a manner such that scenes from the media program continue to be displayed on the touch screen during the fast forwarding and the rewinding of the media program.

In some embodiments, the computer programming code for performing the displaying the media program includes computer programming code for performing one of: streaming the media program to the electronic device from an online database via a wireless or wired telecommunications protocol; and playing the media program that is stored locally on the electronic device.

In some embodiments, the computer programming code for performing the detecting the input from the user includes computer programming code for detecting a press of a virtual button on the touch screen.

In some embodiments, the computer programming code, when executed, further perform: displaying a plurality of icons on the touch screen, the virtual button being one of the icons; wherein: the icons are configured to trigger the appearance of the scroll bar in response to a gesture-based user input; and the icons each correspond to a respective scroll bar having a different fraction of the total duration of the media program.

In some embodiments, the computer programming code for the triggering comprises computer programming code for displaying a plurality of the scroll bars in response to detecting the gesture-based user input for the icons associated with the plurality of the scroll bars.

In some embodiments, the scroll bar is a second scroll bar and the indicator is a second indicator, and wherein the computer programming code for performing the detecting and the triggering include computer programming code for performing the following steps: detecting a user gesture performed on the touch screen; displaying a first scroll bar including a first indicator on the touch screen, wherein the first indicator is configured to be moved along the first scroll bar, wherein a length of the first scroll bar represents the total duration of the media program; detecting, via the touch screen, the user's movement of the first indicator along the first scroll bar; measuring a speed of the first indicator; performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the computer programming code for triggering the appearance of the scroll bar includes computer programming code for: displaying the indicator in a center of the scroll bar as an initial position of the indicator; rewinding the media program in response to a movement of the indicator in a first direction; and fast forwarding the media program in response to a movement of the indicator in a second direction opposite the first direction.

Another one of the broader forms of the present disclosure involves a method of managing media playback. The method includes: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

In some embodiments, the method further includes: detecting, via the touch screen, the user's movement of the indicator along the scroll bar; and performing one of the following actions in response to the user's movement of the indicator: fast forwarding the media program; and rewinding the media program.

In some embodiments, the fast forwarding and the rewinding are performed in a manner such that scenes from the media program continue to be displayed on the touch screen during the fast forwarding and the rewinding of the media program.

In some embodiments, the displaying the media program includes one of: streaming the media program to the electronic device from an online database via a wireless or wired telecommunications protocol; and playing the media program that is stored locally on the electronic device.

In some embodiments, the detecting the input from the user indicating that the user wishes to fast forward or rewind the media program includes detecting a press of a virtual button on the touch screen.

In some embodiments, the method further includes: displaying a plurality of icons on the touch screen, the virtual button being one of the icons; wherein: the icons are configured to trigger the appearance of the scroll bar in response to a gesture-based user input; and the icons each correspond to a respective scroll bar having a different fraction of the total duration of the media program.

In some embodiments, the triggering comprises displaying a plurality of the scroll bars in response to detecting the gesture-based user input for the icons associated with the plurality of the scroll bars.

In some embodiments, the scroll bar is a second scroll bar and the indicator is a second indicator, and wherein the detecting and the triggering are performed in a manner to include the following steps: detecting a user gesture performed on the touch screen; displaying a first scroll bar including a first indicator on the touch screen, wherein the first indicator is configured to be moved along the first scroll bar, wherein a length of the first scroll bar represents the total duration of the media program; detecting, via the touch screen, the user's movement of the first indicator along the first scroll bar; measuring a speed of the first indicator; performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the triggering the appearance of the scroll bar is performed in a manner such that the indicator is initially positioned in a center of the scroll bar, and wherein a movement of the indicator in a first direction corresponds to a rewinding of the media program, and wherein a movement of the indicator in a second direction opposite the first direction corresponds to a fast forwarding of the media program.

One more of the broader forms of the present disclosure involves a system for playing digital media. The system includes: a computer database configured to electronically stores a plurality of media programs each in a digital format; and a user interface module installed on a portable touch screen electronic device located remotely from the computer database, wherein the portable touch screen electronic device is configured to communicate with the computer database via a wireless or wired telecommunications protocol, and wherein the user interface module contains computer programming instructions, that when executed, perform the following tasks: displaying a media program on a touch screen of an electronic device; detecting, via the touch screen, an input from a user indicating that the user wishes to fast forward or rewind the media program; and triggering, in response to the detected input from the user, an appearance of a scroll bar including an indicator on the touch screen; wherein: the indicator is configured to be moved along the scroll bar; a length of the scroll bar represents a predefined amount of time that is a fraction of a total duration of the media program; and a position of the indicator relative to the scroll bar corresponds to a time location of the media program.

In some embodiments, the user interface module contains computer programming code, that when executed, performs the further tasks: detecting, via the touch screen, the user's movement of the indicator along the scroll bar; and performing one of the following actions in response to the user's movement of the indicator: fast forwarding the media program; and rewinding the media program.

In some embodiments, the computer code of the user interface module, when executed, performs the fast forwarding and the rewinding in a manner such that scenes from the media program continue to be displayed on the touch screen during the fast forwarding and the rewinding of the media program.

In some embodiments, the computer code of the user interface module, when executed, performs the displaying the media program by one of: streaming the media program to the electronic device from an online database via a wireless or wired telecommunications protocol; and playing the media program that is stored locally on the electronic device.

In some embodiments, the computer code of the user interface module, when executed, performs the detecting the input from the user to include detecting a press of a virtual button on the touch screen.

In some embodiments, the computer code of the user interface module, when executed, performs the further tasks: displaying a plurality of icons on the touch screen, the virtual button being one of the icons; wherein: the icons are configured to trigger the appearance of the scroll bar in response to a gesture-based user input; and the icons each correspond to a respective scroll bar having a different fraction of the total duration of the media program.

In some embodiments, the computer code of the user interface module, when executed, performs the triggering to include displaying a plurality of the scroll bars in response to detecting the gesture-based user input for the icons associated with the plurality of the scroll bars.

In some embodiments, the scroll bar is a second scroll bar and the indicator is a second indicator, and wherein the computer code of the user interface module, when executed, perform the detecting and the triggering in a manner to include the following steps: detecting a user gesture performed on the touch screen; displaying a first scroll bar including a first indicator on the touch screen, wherein the first indicator is configured to be moved along the first scroll bar, wherein a length of the first scroll bar represents the total duration of the media program; detecting, via the touch screen, the user's movement of the first indicator along the first scroll bar; measuring a speed of the first indicator; performing, if the speed of the first indicator exceeds a predefined reference speed, a fast forwarding or a rewinding of the media program at a rate that is a function of the speed of the first indicator, wherein the fast forwarding or the rewinding is carried out using the first scroll bar and without the second scroll bar; and triggering, if the speed of the first indicator is less than the predefined speed, the appearance of the second scroll bar and the second indicator and thereafter performing a fast forwarding or a rewinding of the media program using the second scroll bar in response to the a detected movement of the second indicator along the second scroll bar.

In some embodiments, the computer code of the user interface module, when executed, performs the triggering the appearance of the scroll bar in a manner such that the indicator is initially positioned in a center of the scroll bar, and wherein a movement of the indicator in a first direction corresponds to a rewinding of the media program, and wherein a movement of the indicator in a second direction opposite the first direction corresponds to a fast forwarding of the media program.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. An electronic device, comprising:
    a touchscreen configured to receive gestured-based input from a user;
    a memory storage component configured to store computer programming code; and
    a computer processor configured to execute the computer programming code to perform the following:
        displaying a media program on the touch screen;
        detecting a user gesture performed on the touch screen;
        displaying a first scroll bar including a first indicator on the touch screen, wherein the first indicator is configured to be moved along the first scroll bar, wherein a length of the first scroll bar represents a total time duration of the media program, and wherein a position of the first indicator relative to the first scroll bar corresponds to a time location of the media program;
        detecting, via the touch screen, the user's movement of the first indicator along the first scroll bar, wherein the user's movement of the first indicator is greater than a zero-speed;
        measuring a speed of the first indicator;
        when the measured speed of the first indicator exceeds a predefined reference speed, navigating the media program at a rate that is a function of the speed of the first indicator, wherein the navigating is performed using the first scroll bar; and
        when the measured speed of the first indicator is less than the predefined speed but is greater than the zero-speed, performing the following actions:
            displaying a second scroll bar and a second indicator, wherein the second indicator is configured to be moved along the second scroll bar, wherein a length of the second scroll bar represents a predefined amount of time that is less than the total time duration of the media program and wherein a position of the second indicator relative to the second scroll bar corresponds to a time location of the media program; and
            thereafter navigating the media program using the second scroll bar in response to the detected movement of the second indicator along the second scroll bar.

2. The electronic device of claim 1, wherein the displaying the second scroll bar comprises displaying the second scroll bar and the first scroll bar simultaneously.

3. The electronic device of claim 1, wherein the displaying the second scroll bar comprises replacing the first scroll bar with the second scroll bar on the touch screen.

4. The electronic device of claim 1, wherein the displaying the second scroll bar is performed such that the length of the first scroll bar and the length of the second scroll bar have similar sizes.

5. The electronic device of claim 1, wherein the predefined amount of time represented by the length of the second scroll bar is a function of the measured speed of the first indicator.

6. The electronic device of claim 5, wherein the predefined amount of time represented by the length of the second scroll bar is the function of the measured speed of the first indicator in a manner such that, while the length of the second scroll bar remains the same:
    as the measured speed of the first indicator decreases, the predefined amount of time decreases; and
    as the measured speed of the first indicator increases, the predefined amount of time increases.

7. A method of managing media playback, comprising:
    displaying a media program on a touch screen of an electronic device;
    detecting a user gesture performed on the touch screen;
    displaying a first scroll bar including a first indicator on the touch screen, wherein the first indicator is configured to be moved along the first scroll bar, wherein a length of the first scroll bar represents a total time duration of the media program, and wherein a position of the first indicator relative to the first scroll bar corresponds to a time location of the media program;
    detecting, via the touch screen, the user's movement of the first indicator along the first scroll bar, wherein the user's movement of the first indicator occurs at a non-zero speed;
    measuring a speed of the first indicator;
    when the measured speed of the first indicator exceeds a predefined reference speed, navigating the media program at a rate that is a function of the speed of the first indicator, wherein the navigating is performed using the first scroll bar; and
    when the measured speed of the first indicator is less than the predefined speed but is greater than a zero-speed, performing the following actions:
        displaying a second scroll bar and a second indicator, wherein the second indicator is configured to be moved along the second scroll bar, wherein a length of the second scroll bar represents a predefined amount of time that is less than the total time duration of the media program and wherein a position of the second indicator relative to the second scroll bar corresponds to a time location of the media program; and
        thereafter navigating the media program using the second scroll bar in response to the detected movement of the second indicator along the second scroll bar.

8. The method of claim 7, wherein the displaying the media program includes one of:
    streaming the media program to the electronic device from an online database via a wireless or wired telecommunications protocol; and
    playing the media program that is stored locally on the electronic device.

9. The method of claim 7, wherein the displaying of the second scroll bar and the second indictor is performed in a manner such that the second indicator is initially positioned in a center of the second scroll bar, and wherein a movement of the second indicator in a first direction corresponds to a rewinding of the media program, and wherein a movement of the second indicator in a second direction opposite the first direction corresponds to a fast forwarding of the media program.

10. The method of claim 7, wherein the displaying the second scroll bar comprises displaying the second scroll bar and the first scroll bar simultaneously.

11. The method of claim 7, wherein the displaying the second scroll bar comprises replacing the first scroll bar with the second scroll bar on the touch screen.

12. The method of claim 7, wherein the displaying the second scroll bar is performed such that the length of the first scroll bar and the length of the second scroll bar have similar sizes.

13. The method of claim 7, wherein the predefined amount of time represented by the length of the second scroll bar is a function of the measured speed of the first indicator.

14. The method of claim 13, wherein the predefined amount of time represented by the length of the second scroll bar is positively correlated with the measured speed of the first indicator.

15. A system for playing digital media, comprising:
a computer database configured to electronically stores a plurality of media programs each in a digital format; and
a user interface module installed on a portable touch screen electronic device located remotely from the computer database, wherein the portable touch screen electronic device is configured to communicate with the computer database via a wireless or wired telecommunications protocol, and wherein the user interface module contains computer programming instructions, that when executed, perform the following tasks:
displaying a media program on a touch screen of an electronic device;
detecting a user gesture performed on the touch screen;
displaying a first scroll bar including a first indicator on the touch screen, wherein the first indicator is configured to be moved along the first scroll bar, wherein a length of the first scroll bar represents a total time duration of the media program, and wherein a position of the first indicator relative to the first scroll bar corresponds to a time location of the media program;
detecting, via the touch screen, the user's movement of the first indicator along the first scroll bar, wherein the user's movement of the first indicator is greater than a zero-speed;
measuring a speed of the first indicator;
when the measured speed of the first indicator exceeds a predefined reference speed, navigating the media program at a rate that is a function of the speed of the first indicator, wherein the navigating is performed using the first scroll bar; and
when the measured speed of the first indicator is less than the predefined speed but is greater than the zero-speed, performing the following actions:
displaying a second scroll bar and a second indicator, wherein the second indicator is configured to be moved along the second scroll bar, wherein a length of the second scroll bar represents a predefined amount of time that is less than the total time duration of the media program and wherein a position of the second indicator relative to the second scroll bar corresponds to a time location of the media program; and
thereafter navigating the media program using the second scroll bar in response to the detected movement of the second indicator along the second scroll bar.

16. The system of claim 15, wherein the computer code of the user interface module, when executed, performs the displaying the media program by one of:
streaming the media program to the electronic device from an online database via a wireless or wired telecommunications protocol; and
playing the media program that is stored locally on the electronic device.

17. The system of claim 15, wherein the displaying the second scroll bar comprises displaying the second scroll bar and the first scroll bar simultaneously.

18. The system of claim 15, wherein the displaying the second scroll bar comprises replacing the first scroll bar with the second scroll bar on the touch screen.

19. The system of claim 15, wherein the displaying the second scroll bar is performed such that the length of the first scroll bar and the length of the second scroll bar have similar sizes.

20. The system of claim 15, wherein the predefined amount of time represented by the length of the second scroll bar is a function of the measured speed of the first indicator.

21. The system of claim 20, wherein the predefined amount of time represented by the length of the second scroll bar is the function of the measured speed of the first indicator in a manner such that, while the length of the second scroll bar remains the same:
as the measured speed of the first indicator decreases, the predefined amount of time decreases; and
as the measured speed of the first indicator increases, the predefined amount of time increases.

* * * * *